(12) United States Patent
Hamada

(10) Patent No.: US 9,077,621 B2
(45) Date of Patent: Jul. 7, 2015

(54) APPARATUS, SYSTEM, AND METHOD OF LOG MANAGEMENT, AND RECORDING MEDIUM STORING LOG MANAGEMENT PROGRAM

(75) Inventor: Yuuta Hamada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 410 days.

(21) Appl. No.: 13/070,027

(22) Filed: Mar. 23, 2011

(65) Prior Publication Data

US 2011/0246644 A1    Oct. 6, 2011

(30) Foreign Application Priority Data

Mar. 31, 2010  (JP) ................................. 2010-082249
Jan. 17, 2011  (JP) ................................. 2011-006612

(51) Int. Cl.
*H04L 12/26* (2006.01)
*H04L 12/24* (2006.01)
*G06F 11/34* (2006.01)

(52) U.S. Cl.
CPC ............. *H04L 43/0811* (2013.01); *H04L 41/06* (2013.01); *G06F 11/3476* (2013.01)

(58) Field of Classification Search
None
See application file for complete search history.

(56) References Cited

U.S. PATENT DOCUMENTS

| | | | |
|---|---|---|---|
| 6,347,374 B1 * | 2/2002 | Drake et al. .................... 726/1 |
| 6,697,948 B1 * | 2/2004 | Rabin et al. ................... 726/30 |
| 6,718,378 B1 * | 4/2004 | Machida ........................ 709/223 |
| 7,546,365 B2 * | 6/2009 | Torii ............................... 709/224 |
| 7,593,983 B2 * | 9/2009 | Machida ........................ 709/203 |
| 7,852,502 B2 * | 12/2010 | Horiyama et al. ............. 358/1.15 |
| 7,852,505 B2 * | 12/2010 | Kumagai ....................... 358/1.15 |
| 8,019,853 B2 * | 9/2011 | Machida ........................ 709/224 |
| 8,065,406 B2 * | 11/2011 | Kishimoto .................... 709/223 |
| 8,169,637 B2 * | 5/2012 | Matsumoto et al. .......... 358/1.15 |
| 2003/0204590 A1 * | 10/2003 | Torii ............................... 709/224 |
| 2004/0133448 A1 * | 7/2004 | Higashi et al. .................... 705/1 |
| 2006/0112016 A1 * | 5/2006 | Ishibashi ........................ 705/52 |
| 2010/0005167 A1 * | 1/2010 | Kishimoto .................... 709/224 |

FOREIGN PATENT DOCUMENTS

CN    1729671 A    2/2006
CN    101043375 A    9/2007

(Continued)

OTHER PUBLICATIONS

Office Action issued Apr. 27, 2013 in Chinese Patent Application No. 201110069930.9.

(Continued)

*Primary Examiner* — Marcus R Smith
*Assistant Examiner* — Omeed D Rahgozar
(74) *Attorney, Agent, or Firm* — Oblon, McClelland, Maier & Neustadt, L.L.P.

(57) ABSTRACT

An apparatus to manage transmission of log data generated by a transmission terminal from the transmission terminal to a log management device obtains detection result data indicating whether a predetermined event is detected at the log management device, determines whether the log data is to be transmitted from the transmission terminal to the log management device based on the detection result data to generate a determination result, and transmits the transmission approval data having the determination result to the transmission terminal to cause the transmission terminal to process the log data according to the determination result of the transmission approval data.

14 Claims, 29 Drawing Sheets

(56) References Cited

FOREIGN PATENT DOCUMENTS

| | | |
|---|---|---|
| JP | 7-162825 A | 6/1995 |
| JP | 2000-112706 | 4/2000 |
| JP | 2000-209201 A | 7/2000 |
| JP | 2002-366393 A | 12/2002 |
| JP | 2006-107217 A | 4/2006 |
| JP | 2009-157597 A | 7/2009 |

OTHER PUBLICATIONS

Japanese Office Action issued Jul. 1, 2014 in Patent Application No. 2011-006612 (without English Translation).

* cited by examiner

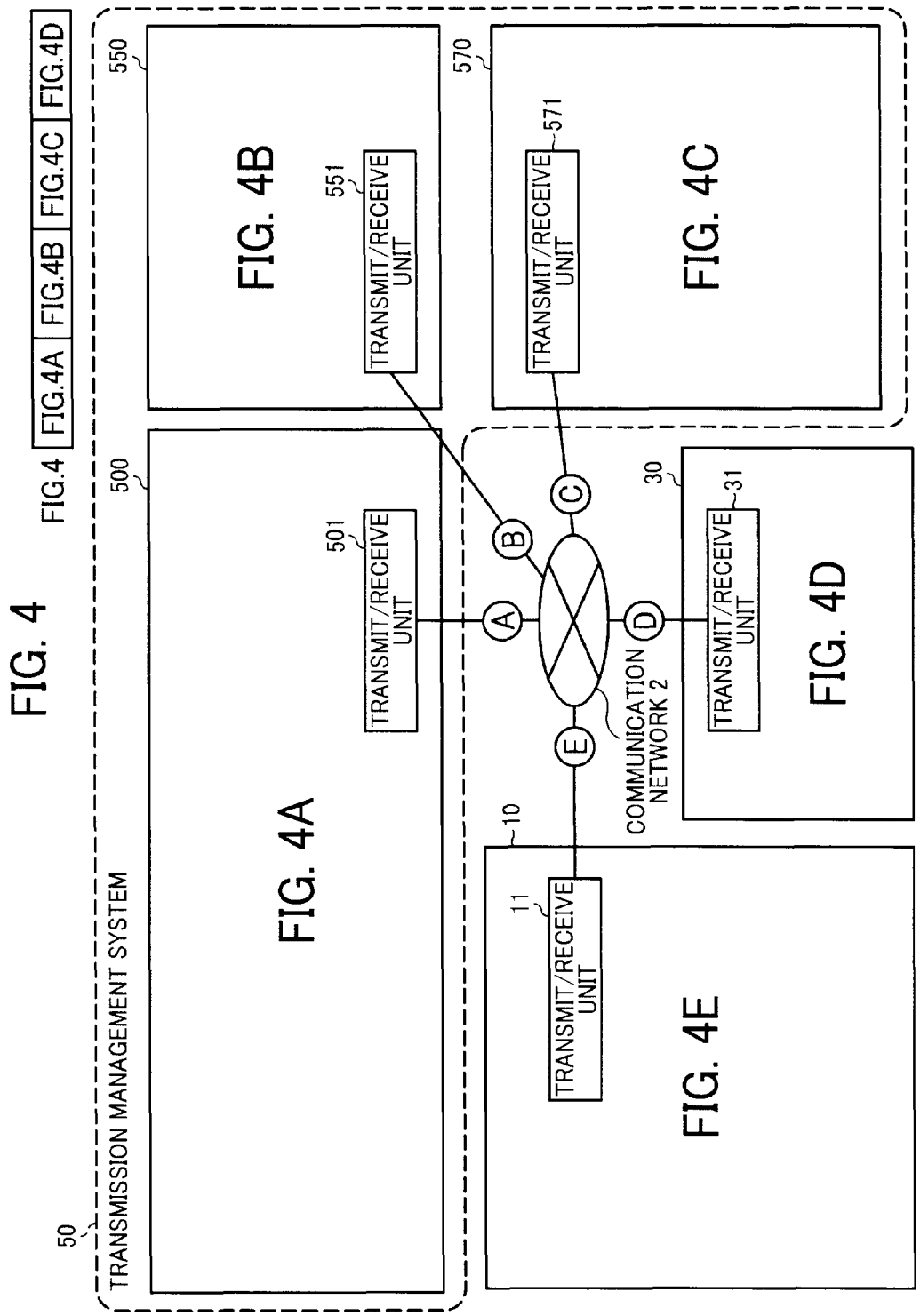

FIG. 5

STORAGE MANAGEMENT TABLE

| PRIORITY DATA | LOG MANAGEMENT DEVICE ID | LOG MANAGEMENT DEVICE IP ADDRESS | LOG TYPE DATA | TRANSMISSION APPROVAL DATA |
|---|---|---|---|---|
| 1 | A | 1.1.1.3 | PRIORITY | APPROVAL |
| | | | GENERAL | DISAPPROVAL |
| 2 | B | 1.1.1.4 | PRIORITY | APPROVAL |
| | | | GENERAL | APPROVAL |

FIG. 6

TEMPORARY LOG MANAGEMENT TABLE

| SESSION ID | LOG DATA | TIME |
|---|---|---|
| SE80 | BYE | 2010.2.3 10:15:30 |
| ... | ... | ... |

FIG. 7A

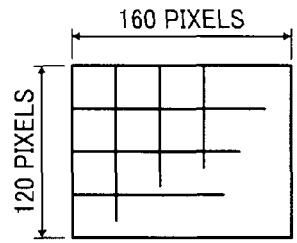

160 PIXELS × 120 PIXELS

LOW RESOLUTION IMAGE

FIG. 7B

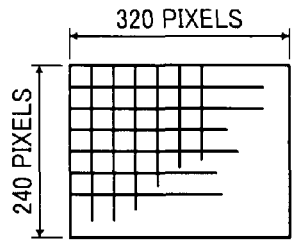

320 PIXELS × 240 PIXELS

MIDDLE RESOLUTION IMAGE

FIG. 7C

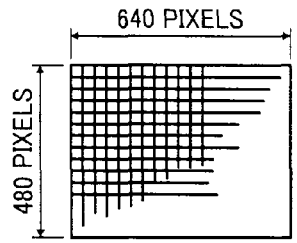

640 PIXELS × 480 PIXELS

HIGH RESOLUTION IMAGE

FIG. 8

CHANGE QUALITY MANAGEMENT TABLE

| RELAY ADDRESS TERMINAL IP ADDRESS | IMAGE DATA QUALITY |
|---|---|
| 1.3.2.4 | HIGH |
| 1.3.1.3 | LOW |
| 1.3.2.3 | MIDDLE |
| ... | ... |

FIG. 9

RELAYING DEVICE MANAGEMENT TABLE

| RELAYING DEVICE ID | OPERATING STATE | RECEIVED DATE | RELAYING DEVICE IP ADDRESS | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |

FIG. 10

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 11

TERMINAL MANAGEMENT TABLE

| TERMINAL ID | OPERATING STATE | RECEIVED DATE | TERMINAL IP ADDRESS |
|---|---|---|---|
| 01aa | ON LINE | 2009.11.10.13:40 | 1.2.1.3 |
| 01ab | OFF LINE | 2009.11.09.12:00 | 1.2.1.4 |
| 01ba | ON LINE | 2009.11.10.13:45 | 1.2.2.3 |
| ... | ... | ... | ... |
| 01db | ON LINE | 2009.11.10.13:50 | 1.3.2.4 |

FIG. 12

DESTINATION LIST MANAGEMENT TABLE

| REQUESTER TERMINAL ID | DESTINATION TERMINAL ID |
|---|---|
| 01aa | 01ab, 01ba, 01db |
| 01ab | 01aa, 01ba, 01ca |
| 01ba | 01aa, 01ab, 01cb, 01da |
| ... | ... |
| 01db | 01aa, 01ab, 01da |

FIG. 13

SESSION MANAGEMENT TABLE

| SESSION ID | RELAYING DEVICE ID | REQUESTER TERMINAL ID | DESTINATION TERMINAL ID | DELAY TIME (ms) | RECEIVED DATE |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG. 14

ADDRESS PRIORITY MANAGEMENT TABLE

| MATCHING ON EACH PART OF DOT ADDRESS | ADDRESS PRIORITY POINT |
|---|---|
| S.S.S.D | 5 |
| S.S.D.- | 3 |
| S.D.-.- | 1 |
| D.-.-.- | 0 |

FIG. 15

TRANSMISSION SPEED PRIORITY MANAGEMENT TABLE

| MAXIMUM DATA TRANSMISSION SPEED AT RELAYING DEVICE (Mbps) | TRANSMISSION SPEED PRIORITY POINT |
|---|---|
| 1000 – | 5 |
| 100 – 1000 | 3 |
| 10 – 100 | 1 |
| – 10 | 0 |

FIG. 16

QUALITY MANAGEMENT TABLE

| DELAY TIME (ms) | IMAGE DATA QUALITY |
|---|---|
| 0 – 100 | HIGH |
| 100 – 300 | MEDIUM |
| 300 – 500 | LOW |
| 500 – | (INTERRUPTION) |

FIG. 17

LOG MANAGEMENT TABLE

| LOG ID | LOG DATA | SESSION ID | DATE MANAGEMENT DATA |
|---|---|---|---|
| 001 | invite | se1 | 2009.11.10.13:45 |
| 002 | bye | se1 | 2009.11.10.14:30 |
| ... | ... | ... | ... |
| 025 | invite | se80 | 2010.2.3.9:32 |

FIG. 18

DETECTION RESULT DATA MANAGEMENT TABLE

| DETECTION RESULT DATA | LOG TYPE DATA | TRANSMISSION APPROVAL DATA |
|---|---|---|
| NONE | PRIORITY | APPROVAL |
| | GENERAL | APPROVAL |
| BUSY | PRIORITY | APPROVAL |
| | GENERAL | DISAPPROVAL |
| ERROR | PRIORITY | DISAPPROVAL |
| | GENERAL | DISAPPROVAL |

FIG. 19

DEVICE MANAGEMENT TABLE

| LOG MANAGEMENT DEVICE ID | LOG MANAGEMENT DEVICE IP ADDRESS | LOG TYPE DATA | TRANSMISSION APPROVAL DATA |
|---|---|---|---|
| A | 1.1.1.3 | PRIORITY | APPROVAL |
| | | GENERAL | DISAPPROVAL |
| B | 1.1.1.4 | PRIORITY | APPROVAL |
| | | GENERAL | APPROVAL |
| ... | ... | ... | ... |

FIG. 20

DESTINATION TERMINAL MANAGEMENT TABLE

| DESTINATION TERMINAL ID | TERMINAL IP ADDRESS | LOG MANAGEMENT DEVICE ID |
|---|---|---|
| 01aa | 1.2.1.3 | A , B |
| 01ab | 1.2.1.4 | A , B |
| 01ba | 1.2.2.3 | B , C |
| ... | ... | ... |
| 01dd | 1.3.2.4 | C , D |

FIG. 26

| RELAYING DEVICE ID | ADDRESS PRIORITY POINT | | TRANSMISSION SPEED PRIORITY POINT | COMBINATION POINT |
|---|---|---|---|---|
| | TO TERMINAL 10AA | TO TERMINAL 10AA | | |
| 111a | 5 | 1 | 3 | 8 |
| 111b | 3 | 1 | 5 | 8 |
| 111c | – | – | – | – |
| 111d | 1 | 5 | 1 | 6 |

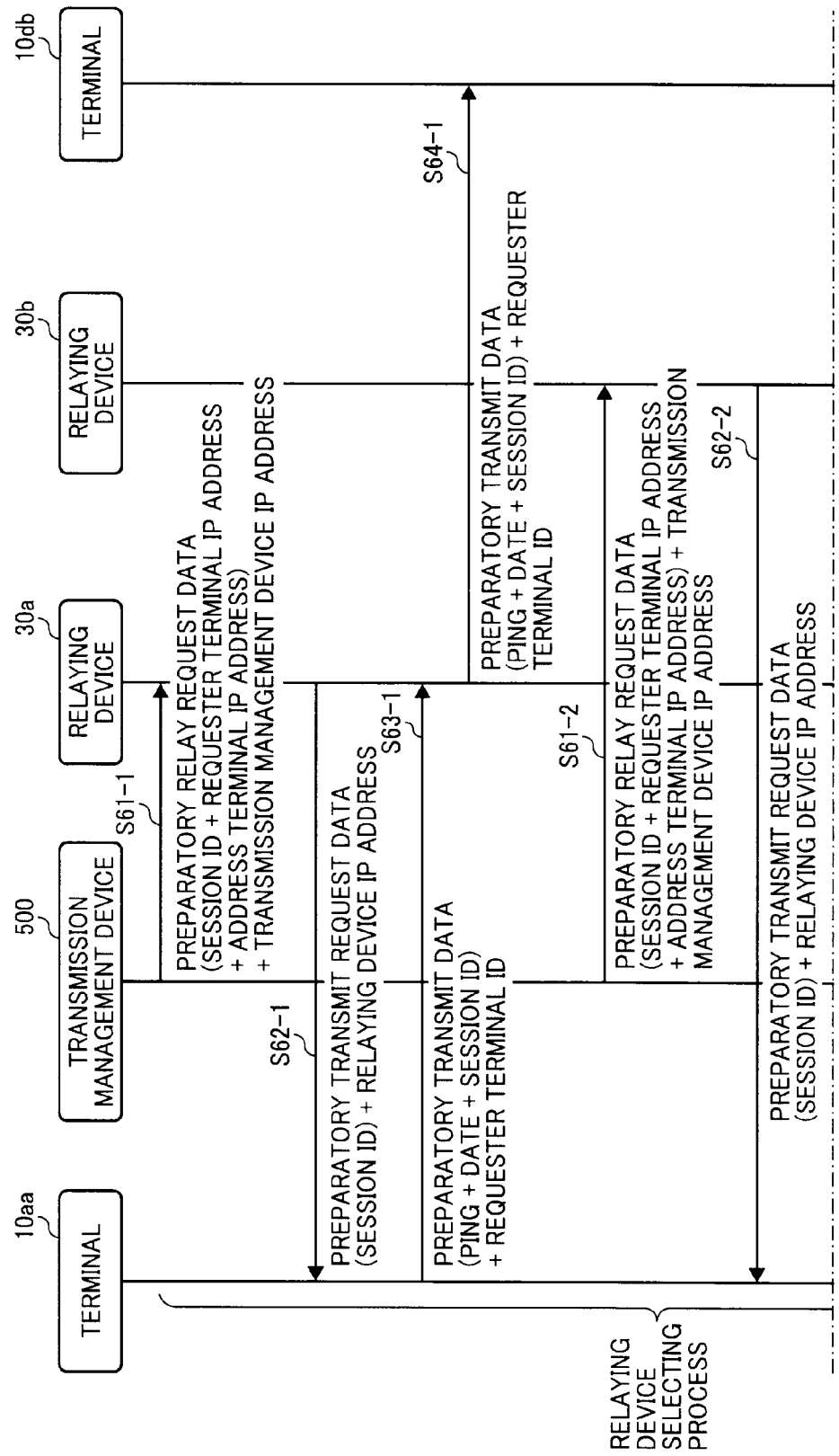

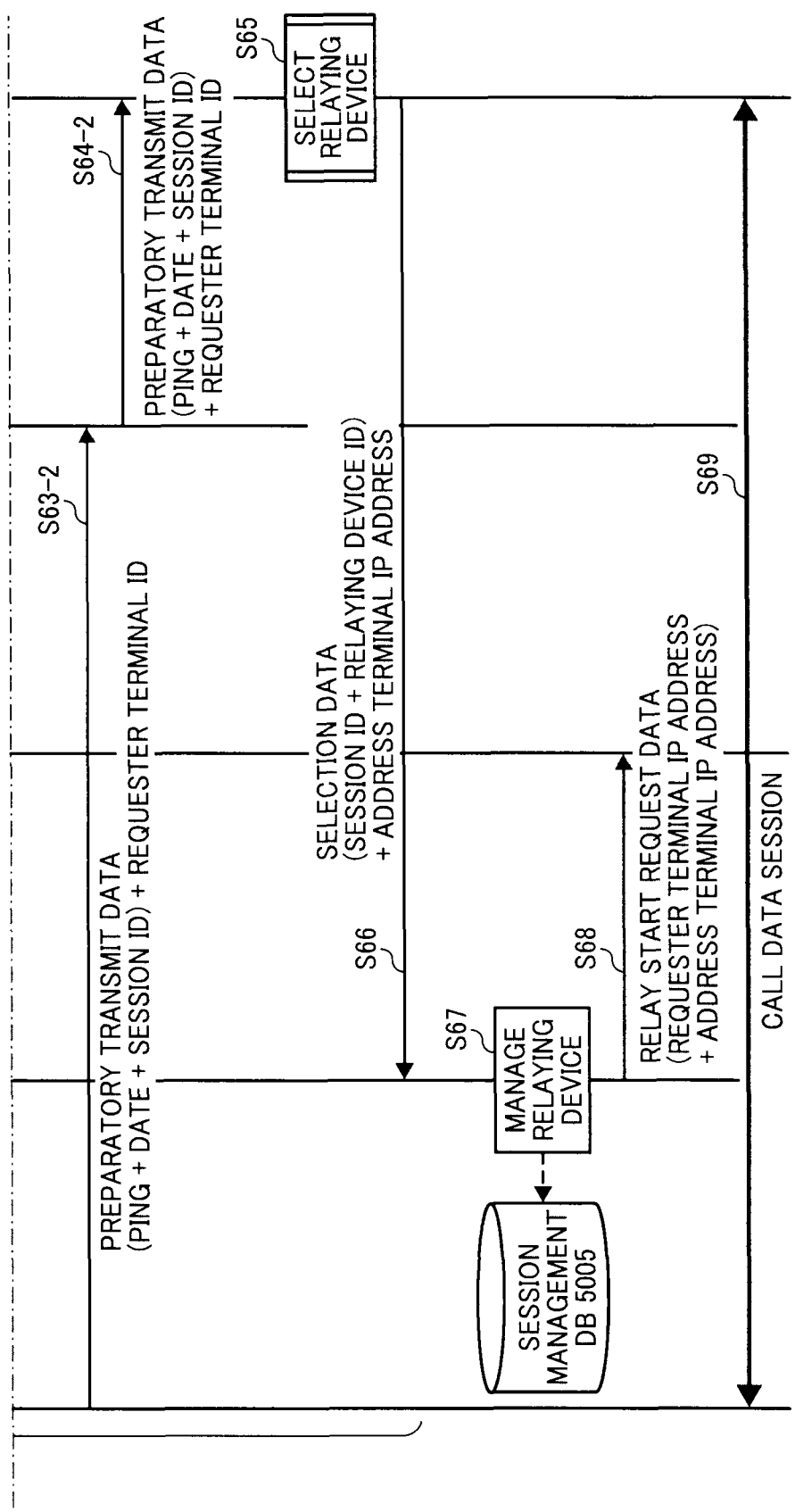

APPARATUS, SYSTEM, AND METHOD OF LOG MANAGEMENT, AND RECORDING MEDIUM STORING LOG MANAGEMENT PROGRAM

CROSS-REFERENCE TO RELATED APPLICATIONS

This patent application is based on and claims priority pursuant to 35 U.S.C. §119 to Japanese Patent Application Nos. 2010-82249, filed on Mar. 31, 2010, and 2011-6612, filed on Jan. 17, 2011, in the Japanese Patent Office, the entire disclosure of which is hereby incorporated herein by reference.

FIELD OF THE INVENTION

The present invention generally relates to a log management system that receives and manages log data from a transmission terminal that produces the log data.

BACKGROUND

Recently, a transmission system such as a communication system, which transmits call data including image data and audio data between transmission terminals such as communication terminals, has been common with the demand to reduce expense and time for business trips. The spread of broadband environments now enables transmission and reception of high-quality image data or audio data, making it easy to grasp the situation of the other side of caller, which enhances the quality of communication.

For instance, in a mobile phone transmission system, when communication terminals start a call, a call request communication terminal requests a call destination communication terminal to transmit call start request data and further requests a communication management device to start calling. The communication management device manages these communication terminals, by management data session. The communication management device, having received the call start request data, requests a relaying device that relays the call data to connect a communication network between these communication terminals. When this communication network is connected between communication terminals via the relaying device, a call data session for transmitting the call data is started. When terminating the call, either one of the communication terminals terminates the call data session, and transmits call end data to the communication management device through the management data session. In this way, the communication management device receives the call start request data or the call end data, while associating this data with time information. In this manner, the communication management device is able to manage duration time of the call.

However, the management data session may be interrupted after the call data session is started between communication terminals due to a failure caused in a network or the communication management device. In such case, the call data session may be continued as long as the communication network between communication terminals is connected. However, the communication terminal does not transmit the call end data to the communication management device through the management data session.

Japanese Patent Application Publication No. 2000-112706 describes a log management system, in which log data regarding a printing job generated by a first computer is managed by a second computer. The first computer judges the operating state of the second computer, and operates to transmit the log data to the system.

SUMMARY

If this method performed by the log management system described in Japanese Patent Application Publication No. 2000-112706 is applied to the above-described transmission system in which the management data session is interrupted, the communication terminal may be able to temporarily hold the call end data, and transmit the call end data when the operating state of the communication management device indicates that the communication management device normally operates. However, the communication management device needs to transmit data regarding the operating state in response to an inquiry of the communication terminal. Therefore, the communication management device becomes overloaded when there are a large number of communication terminals in the transmission system. Further, the communication terminal transmits log data after requesting an operating state of the communication management device. This may cause a time lag between the time when the communication management device becomes manageable state for new log data and the time when the communication terminal transmits the log data. For instance, when the communication terminal is designed to request the management device for its operating state once per week, the log data may not be transmitted up to one week even if the communication management device becomes capable of managing new log data. Hence, transmission of the log data may be delayed, adversely affecting on management of log data by the communication management device.

In view of the above, example embodiments of the present invention include an apparatus, system, method, and a computer program, each capable of managing transmission of log data generated by a transmission terminal from the transmission terminal to a log management device, by obtaining detection result data indicating whether a predetermined event is detected at the log management device, determining whether the log data is to be transmitted from the transmission terminal to the log management device based on the detection result data to generate a determination result, and transmitting the transmission approval data having the determination result to the transmission terminal to cause the transmission terminal to process the log data according to the determination result of the transmission approval data.

In addition to the above-described example embodiments, the present invention may be practiced in various other ways.

BRIEF DESCRIPTION OF THE DRAWINGS

A more complete appreciation of the disclosure and many of the attendant advantages and features thereof may be readily obtained and understood from the following detailed description with reference to the accompanying drawings, wherein:

FIG. 5 is a conceptual diagram of a storage management table;

FIG. 6 is a conceptual diagram of a temporary log management table;

FIG. 7A, FIG. 7B, and FIG. 7C are conceptual diagrams each illustrating image quality of image data;

FIG. 8 is a conceptual diagram of a change quality management table;

FIG. 9 is a conceptual diagram of a relaying device management table;

FIG. 10 is a conceptual diagram of a terminal authentication management table;

FIG. 11 is a conceptual diagram of a terminal management table;

FIG. 12 is a conceptual diagram of a destination list management table;

FIG. 13 is a conceptual diagram of a session management table;

FIG. 14 is a conceptual diagram of an address priority management table;

FIG. 15 is a conceptual diagram of a transmission rate priority management table;

FIG. 16 is a conceptual diagram of a quality management table;

FIG. 17 is a conceptual diagram of a log management table;

FIG. 18 is a conceptual diagram of a detection result data management table;

FIG. 19 is a conceptual diagram of a log management device management table;

FIG. 20 is a conceptual diagram of an destination terminal management table;

FIG. 26 is an illustration for explaining calculation of priority point performed in selecting a relaying device;

FIGS. 27A and 27B are a conceptual diagram illustrating operation of selecting a relaying device at a transmission terminal;

Figure 1:
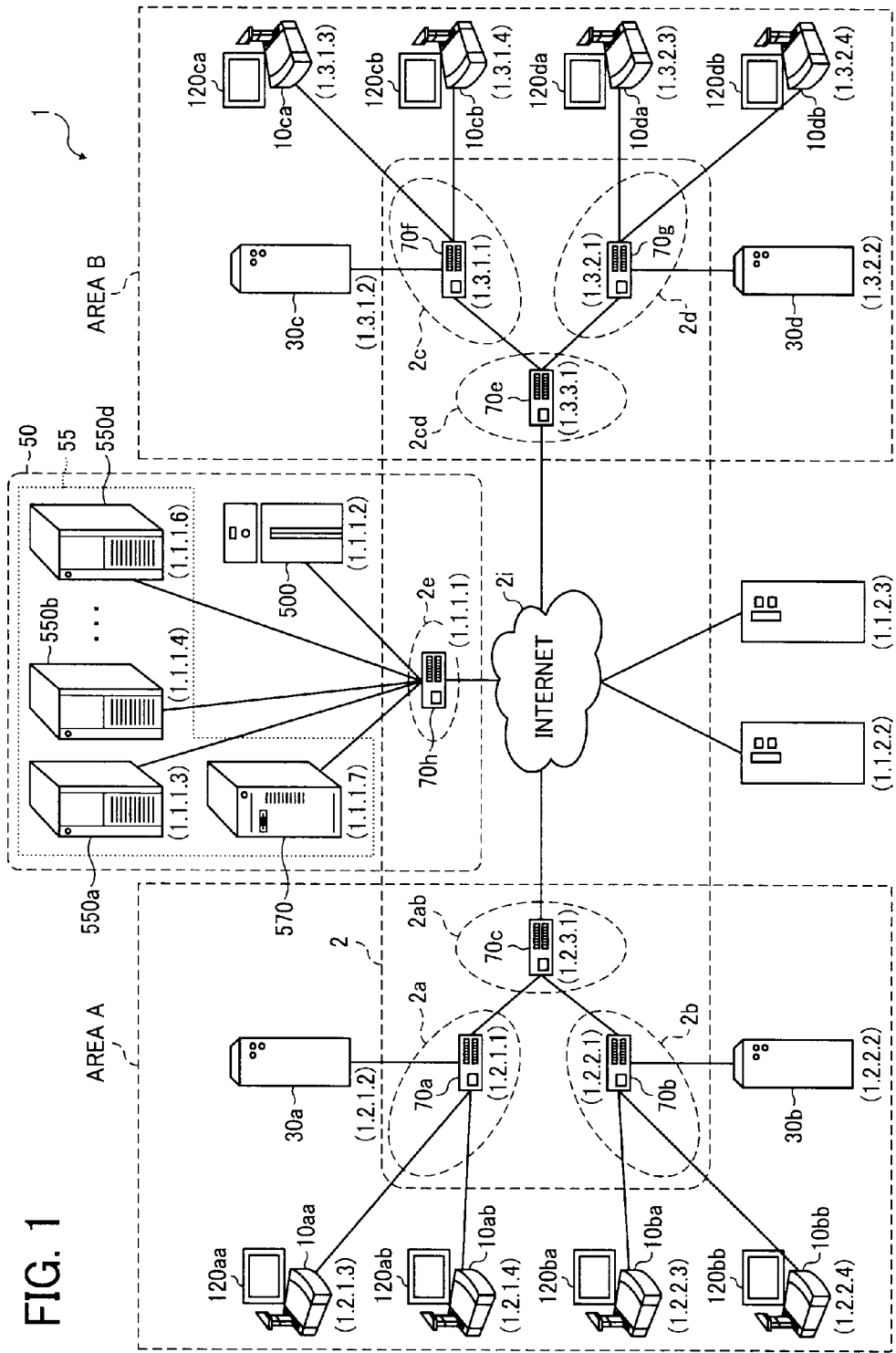
FIG. 1 is a schematic drawing of a transmission system according to one embodiment of the invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

<Configuration of a Transmission System>

One embodiment of the invention will be illustrated below with reference to FIG. 1 to FIG. 34. At first, an outline of one embodiment will be illustrated with FIG. 1, which is a schematic drawing of a transmission system according to one embodiment of the invention.

The transmission system includes a data providing system, which transmits contents data in one direction from one transmission terminal to another transmission terminal via a transmission management system, and a communication system, which transmits data such as information that conveys emotion in interactive way between transmission terminals via the transmission management system. The communication system is a kind of system, which transmits data or emotion data interactively between communication terminals (referred to as "transmission terminals") via a communication management system (referred to as "transmission management system"). For instance, the communication system may be a videoconference system, a videophone system, an audio conferencing system, a voice call system, a personal computer screen sharing system, etc.

In this embodiment, the transmission system, the transmission management system, and the transmission terminal will be illustrated using a videoconference system as an example of the communication system, a videoconference management system as an example of the communication management system, and a videoconference terminal as an example of the communication terminal. That is to say, the transmission terminal and the transmission management system may be applied not only to the videoconference system but also to the communication system or the transmission system.

The transmission system 1, shown in FIG. 1, includes two or more transmission terminals (10aa, 10ab, . . . , 10db), displays (120aa, 120ab, . . . , 120db) for each transmission terminal (10aa, 10ab, . . . , 10db), two or more relaying devices (30a, 30b, 30c, 30d), the transmission management system 50, a program providing system 90, and a maintenance system 100. The transmission management system 50 includes a transmission management device 500 and a log management system 55. The log management system 55 includes two or more log management devices (550a, 550b, ..., 550d) and a transmission approval data management device 570.

Each transmission terminal 10 transmits or receives image data and audio data as an example of the contents data. The "transmission terminal" is simply abbreviated as "terminal" below. In addition, in this embodiment, an arbitrary terminal of the terminals (10aa, 10ab, ..., 10db) is indicated as "terminal 10". An arbitrary display of the displays (120aa, 120ab, ..., 120db) is indicated as "display 120". An arbitrary relaying device of the relaying devices (30a, 30b, 30c, 30d) is indicated as "relaying device 30". An arbitrary log management device of the log management devices (550a, 550b, ..., 550d) is indicated as "log management device 550".

The terminal 10 transmits or receives call data with another terminal 10. The call data is any data to be transmitted or received during a session between the terminals, which includes image data, audio data, and so on. In this embodiment, an image of the image data is implemented as a moving image, however, the image data may include a still image. The relaying device 30 relays the call data (the image data and the audio data) between two or more terminals 10.

The transmission management device 500 of the transmission management system 50 manages the terminal 10 and the relaying device 30 in an integrated fashion. The log management device 550 of the transmission management system 50 receives log data from the terminal 10, and manages the log data. The log data is any data that is related to a session established for transmitting the call data between terminals 10. The transmission approval data management device 570 determines whether or not the terminal 10 should transmit the log data to the log management system 55. For example, the transmission approval data management device 570 generates transmission approval data indicating that the log data is to be transmitted based on the determination result. When the determination result changes, the transmission approval data management device 570 transmits the transmission approval data to the terminal 10 to cause the terminal 10 to transmit the log data or not to transmit the log data.

In FIG. 1, each router (70a, 70b, ..., 70h) selects an optimal route for transmitting the call data (the image data and the audio data) or the log data. An arbitrary router of the routers (70a, 70b, ..., 70h) is indicated as "router 70".

The program providing system 90 includes a hard disk. The hard disk stores a terminal program, which implements a variety of functions or operations to be performed by the terminal 10. The program providing system 90 transmits the program to the terminal 10. In addition, the hard disk stores a relaying device program, which implements a variety of functions or operations to be performed by the relaying device 30. The program providing system 90 transmits the program to the relaying device 30. Furthermore, the hard disk stores a transmission management device program, a log management device program, and a transmission approval data management device program, which implements a variety of functions or operations to be performed by the transmission management device 500, the log management device 550, and the transmission approval data management device 570, respectively. The program providing system may transmit these programs to the transmission management system 50.

The maintenance system 100 is a computer, which maintains or manages at least one of the terminal 10, the relaying device 30, the transmission management system 50, and the program providing system 90. For instance, when the maintenance system 100 is installed within a country, and the terminal 10, the relaying device 30, the transmission management system 50, or the program providing system 90 is installed outside of the country, the maintenance system 100 maintains or manages remotely at least one of the terminal 10, the relaying device 30, the transmission management system 50, and the program providing system 90 over a communication network 2. In addition, the maintenance system 100 maintains a model number, a product serial number, a sale destination, a history of failure for management, and so on, each relating to at least one of the terminal 10, the relaying device 30, the transmission management system 50, and the program providing system 90, without using the communication network 2.

The terminal 10aa, the terminal 10ab, the relaying device 30a, and the router 70a are connected so as to transmit data over a LAN 2a. The terminal 10ba, the terminal 10bb, the relaying device 30b, and the router 70b are connected so as to transmit data over a LAN 2b. The LAN 2A and the LAN 2b are connected so as to transmit data over a dedicated line tab having router 70c, which is constructed in a predetermined area A. For instance, the area A may be located in Japan. The LAN 2a may be constructed in Tokyo office, and the LAN 2b may be constructed in Osaka office.

On the other hand, the terminal 10ca, the terminal 10cb, the relaying device 30c, and the router 70f are connected so as to transmit data over a LAN 2c. The terminal 10da, the terminal 10db, the relaying device 30d, and the router 70g are connected so as to transmit data over a LAN 2d. The LAN 2c and the LAN 2d are connected so as to transmit over an exclusive line 2cd having the router 70e, which is constructed in a predetermined area B. For instance, the area B may be located in U.S.A. The LAN 2c may be constructed in New York office, and the LAN 2d may be constructed in Washington, D.C. office.

In addition, the transmission management device 500, the log management device 550, and the transmission approval data management device 570 are connected so as to transmit data over the LAN 2e. The communication management system 50 and the program providing system 90 are connected so as to transmit data with the terminal 10 and the relaying device 30 over Internet 2i. The communication management system 50 and the program providing system 90 may be installed in the area A, the area B, or the other area.

Meanwhile, in this embodiment, the communication network 2 is constructed by the LAN 2a, the LAN 2b, the exclusive line tab, the Internet 2i, the exclusive line 2cd, the LAN 2c, the LAN 2d, and the LAN 2e. The communication network 2 includes not only a wired part but also a wireless part for transmission.

In FIG. 1, under each of the terminal 10, the relaying device 30, the transmission management device 500, the log management device 550, the transmission approval data management device 570, the router 70, the program providing system 90, and the maintenance system 100, a set of four numerals is shown to indicate an IP address in compliance with IPv4 in simplified form. For instance, the IP address of the terminal 10aa is "1.2.1.3." Alternatively, IPv6 may be used instead of IPv4. However, in this example, IPv4 will be used for the descriptive purposes.

<<Hardware Configuration of this Embodiment>>

Next, a hardware configuration of this embodiment will be illustrated. In this embodiment, it is assumed that a delay occurs when receiving the image data at the terminal 10. In this case, the relaying device 30 changes image resolution of the image data, and transmits the image data to the terminal 10.

Figure 34:
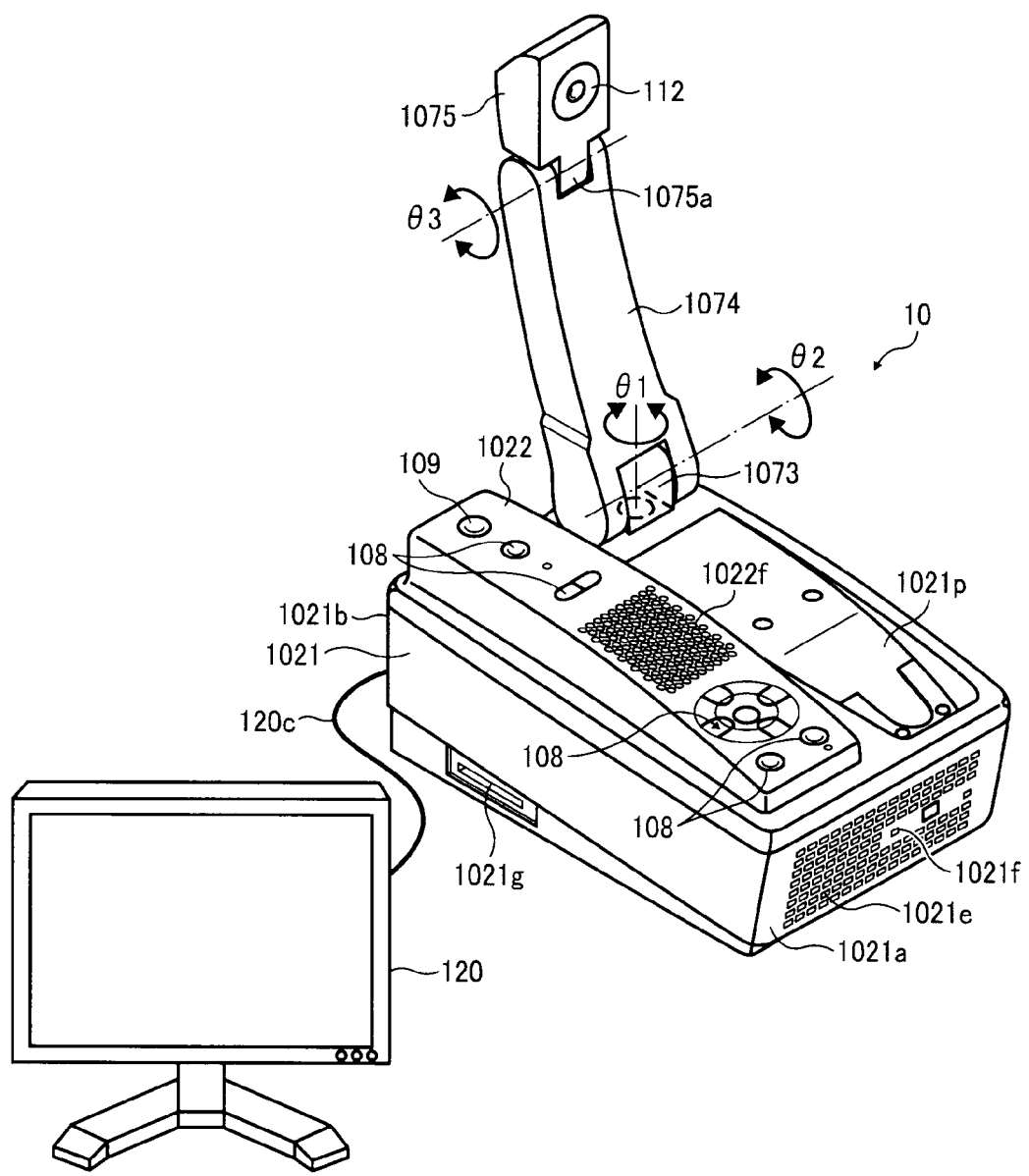
FIG. 34 is a perspective view illustrating the outer appearance of a transmission terminal according to an example embodiment of the present invention.

FIG. 34 is an outline diagram of the terminal according to this embodiment. In FIG. 34, the terminal 10 includes a body 1021, an arm 1074, and a camera housing 1075. The terminal 10 is provided with an inlet surface 1021e having two or more inlets, which is formed across substantially the entire surface of anterior sidewall 1021a of the body 1021. The terminal 10 further includes an outlet surface having two or more outlets, which is formed across substantially the entire surface of posterior sidewall 1021b of the body 1021. This enables to introduce air from the front side of the terminal 10 through the inlet surface 1021e and to exhaust air toward the rear side of the terminal 10 through the outlet surface, by a cooling fan that is built in the terminal 10. The terminal 10 includes a sound absorption hole 1021f formed at the central surface of the anterior sidewall 1021a, which absorbs sound such as voice, tone, and noise through a built-in microphone 114. The terminal 10 includes a connecting port 1021g that may be implemented by a hardware interface, and is used to connect a cable terminal of an external device such as an external camera, microphone, or speaker. The connecting port 1021g is formed at the surface of bottom sidewall of the body 1021.

The terminal 10 includes an operation panel 1022 that is formed at the left portion of the body 1021 when viewed from the top. The terminal 10 further includes an operation button 108 and a power switch 109, which are each provided on the operation panel 1022. In addition, two or more output holes 1022f each outputting sound from a built-in speaker 115 are formed on the operation panel 1022. The arm 1074 and the camera housing 1075A are accommodated in a concave area 1021p, which is formed at the right side of the body 1021 when viewed from the top.

The arm 1074 is assembled to the body 1021 by a torque hinge 1073. This enables the arm 1074 to rotate in the directions of top, bottom, right, and left, with respect to the top surface of the body 1021, while making a pan angle θ1 ranging from plus 180 degrees and minus 180 degrees and a tilt angle θ2 ranging from 0 to 90 degrees with the top surface of the body 1021. When the arm 1074 is tilted at a relative tile angle of about 45 degrees, a clicking sound is generated.

The camera housing 1075 further includes thereon a built-in camera 112, which captures an image of a user, a room, etc. The camera housing 1075 is provided with a torque hinge 1075a. The camera housing 1075 is fixed on the arm 1074 by a torque hinge 1075a. Thus, the camera housing 1075 can be rotated toward the front and rear sides of the terminal 10 in a tilt angle θ3 ranging from about 100 degrees toward the front side to about 90 degrees toward the rear side. The angle degree of which the camera housing 1075 and the arm 1074 are arranged in line with each other is 0 degree.

In this example, a hardware structure of the relaying device 30, the transmission management system 50, the program providing system 90, and the maintenance system 100 are substantially the same to that of a common server or computer. Thus, an explanation of the hardware structure is omitted.

Figure 2:
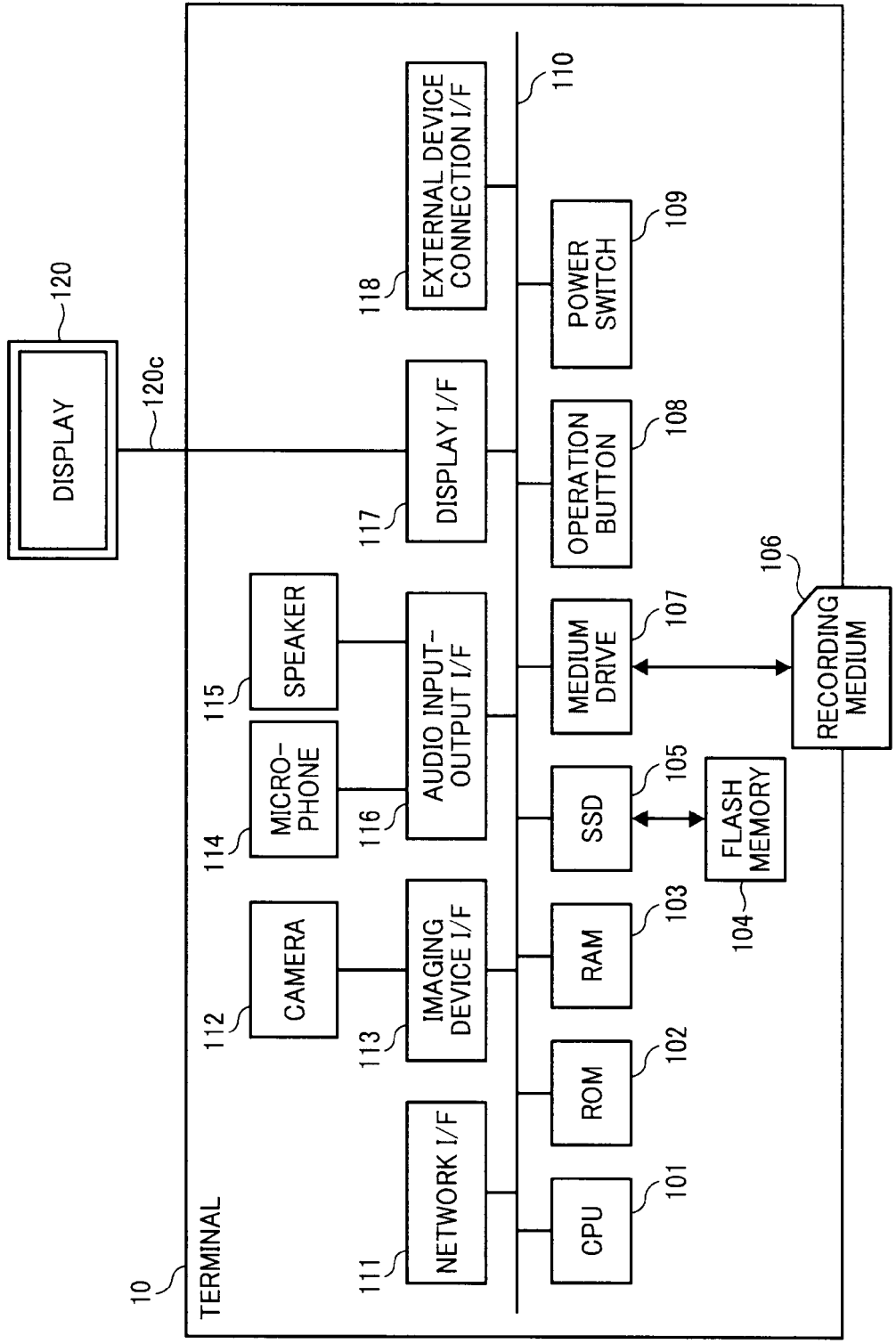
FIG. 2 is a hardware configuration diagram of a transmission terminal according to one embodiment of the invention.

FIG. 2 is a hardware configuration diagram of the terminal according to one embodiment of the invention. As indicated in FIG. 2, the terminal 10 of this embodiment contains a CPU (Central Processing Unit) 101, which controls entire operation of the terminal 10; a ROM (Read Only Memory) 102, which stores the terminal program therein; a RAM (Random Access Memory) 103, which is used for work area of the CPU 101; a flash memory 104, which stores various data such as the image data and the audio data; a SSD (Solid State Drive) 105, which controls read-out or write-in of various data to the flash memory 104 under control of the CPU 101; a media drive 107, which controls read-out or write-in (storing) of data to a recording medium 106; an operation button 108, which is operated when a user selects an destination terminal 10; a power switch 109, which switches the power between on and off; and a network I/F (interface) 111, which transmits data over the communication network 2.

In addition, the terminal 10 contains the built-in camera 112, which takes an image of an object to obtain the image data; an imaging device I/F 113, which controls to drive the camera 112; the built-in microphone 114, which inputs audio data; a built-in speaker 115, which outputs audio data; an audio input-output I/F 116, which processes input or output of audio signal between the microphone 114 and the speaker 115 under control of the CPU 101; a display I/F 117, which transmits the image data to an external display 120 under control of the CPU 101; a external device connection I/F 118, which is connected to the connecting port 1021g to connect various external devices; and a bus line 110 such as an address bus or a data bus, which connects the above-described components electrically as illustrated in FIG. 2.

The display 120, which may be composed of liquid crystal or organic EL, displays an image of an object, an icon for operation, and so on. The display 120 is connected to the display OF 117 by a cable 120c. The cable 120c may be a cable for analog RGB (VGA) signals, component video, HDMI (High-Definition Multimedia Interface) signals, or DVI (Digital Video Interactive) signals.

The camera 112 contains a lens, and an image pickup device that converts light to electric charge to digitize a still image or a video image of an object. The image pickup device may be made of a CMOS (Complementary Metal Oxide Semiconductor) or CCD (Charge Coupled Device).

The external device connection I/F 118 may be connected to an external device such as an external camera, an external microphone, and an external speaker by a USB (Universal Serial Bus) cable. When the external camera is connected, the external camera is driven before the built-in camera 112 is driven under control of the CPU 101. In a substantially similar manner, when the external microphone or the external speaker is connected, the external microphone or the external speaker is driven before the built-in microphone 114 or the built-in speaker 115 is driven under control of the CPU 101.

In the above-described example, the recording medium 106 is removably attached to the terminal 10. The flash memory 104 may be replaced with a nonvolatile memory, such as EEPROM (Electrically Erasable and Programmable ROM), to read-out or write-in data under control of the CPU 101.

Furthermore, the terminal program described above may be distributed by a computer-readable recording medium such as the recording medium 106. Further, the terminal program may be stored in the form of file that is installable or executable by a general-purpose computer.

Figure 3:
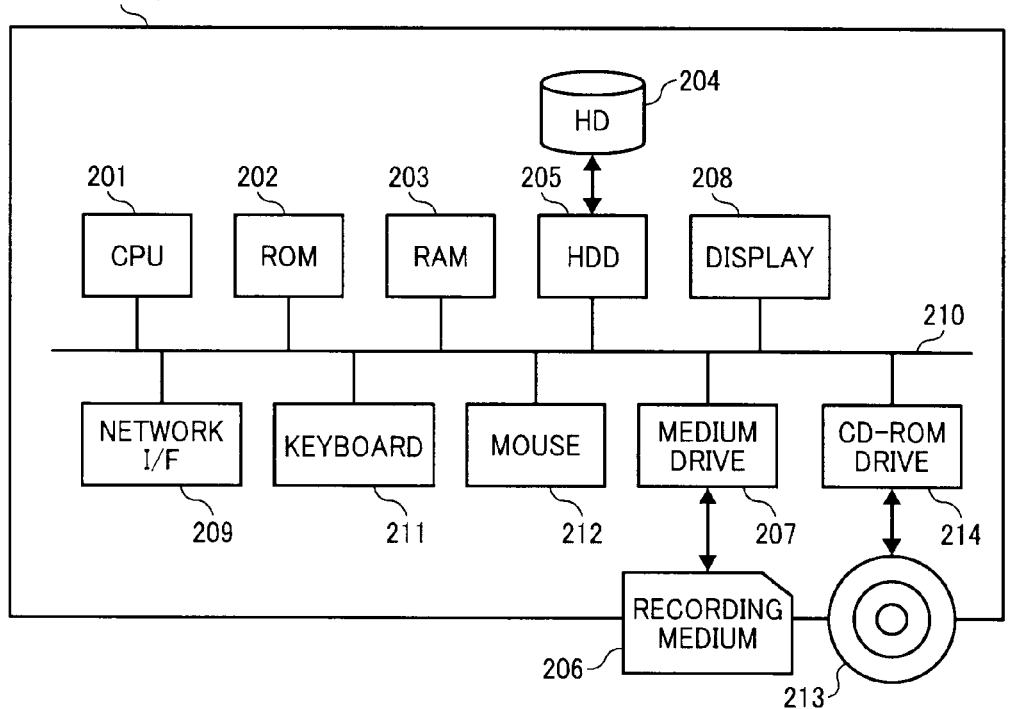
FIG. 3 is a hardware configuration diagram of a transmission management system, a relaying device, a program providing system, or a maintenance system according to one embodiment of the invention.
Figure 4A:
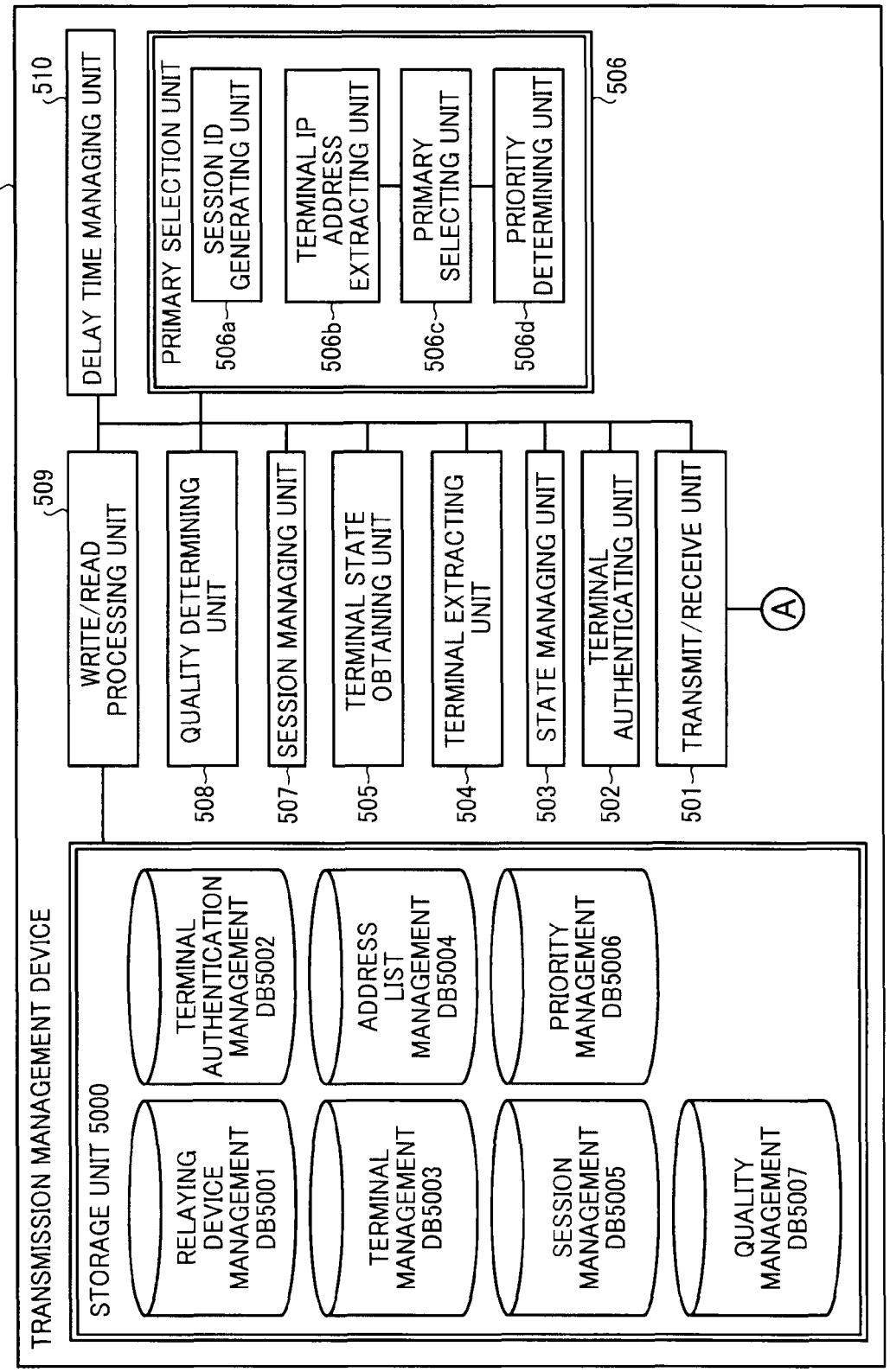
FIG. 4 is a functional block diagrams illustrating a functional structure of a transmission system of FIG. 1.
Figure 4C:
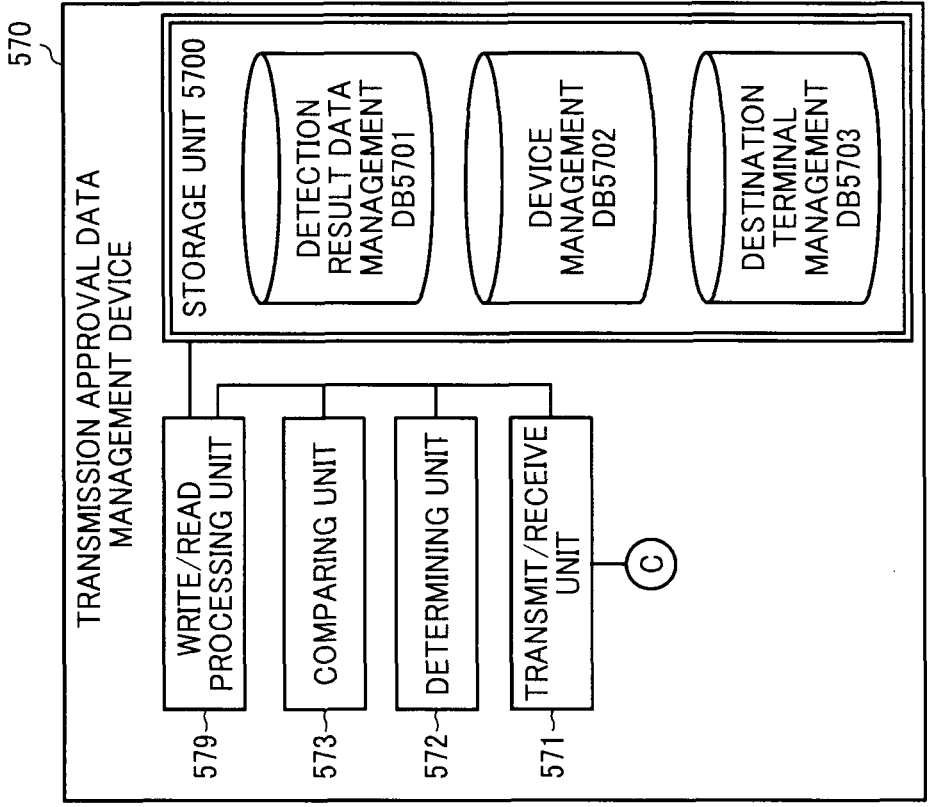
Figure 4B:
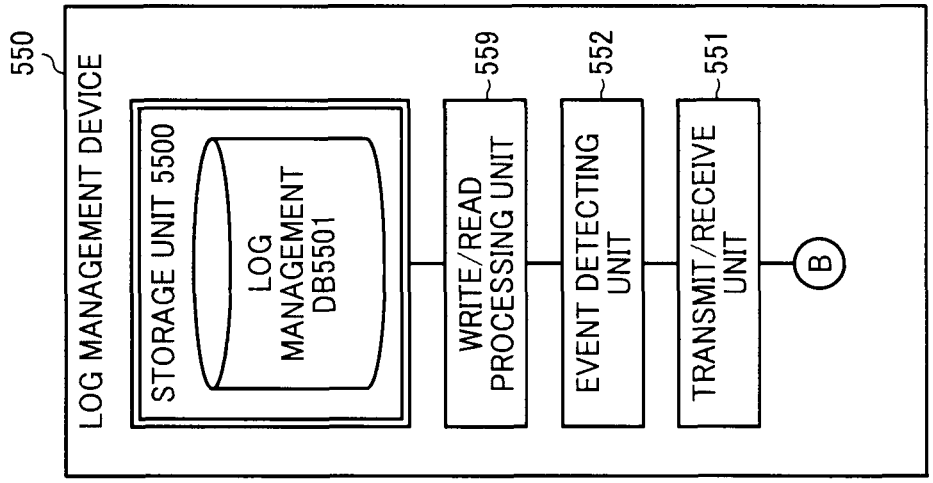
Figure 4D:
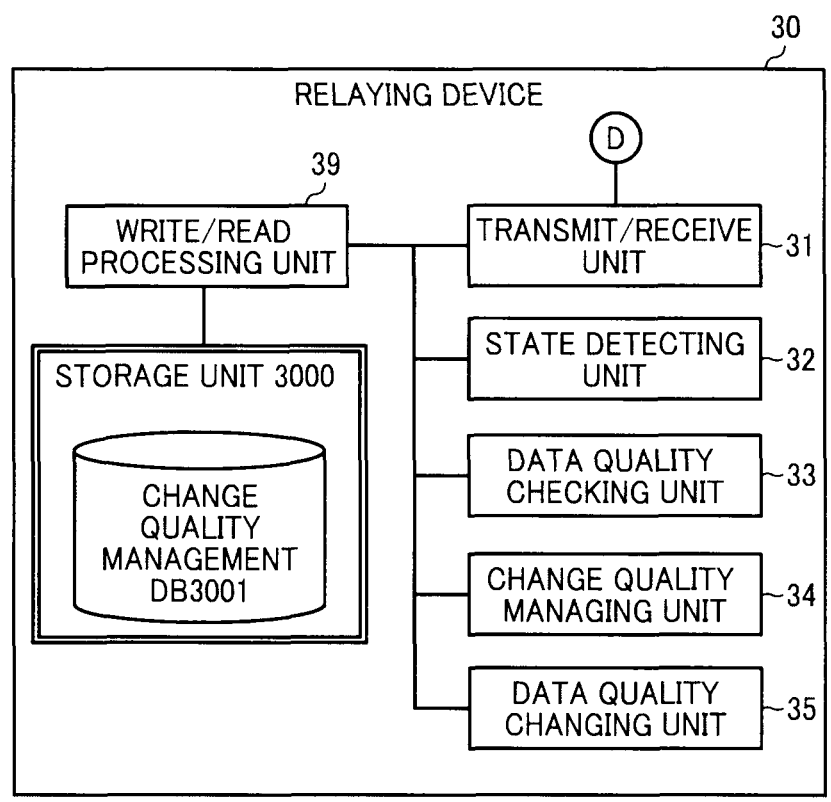
Figure 4E:
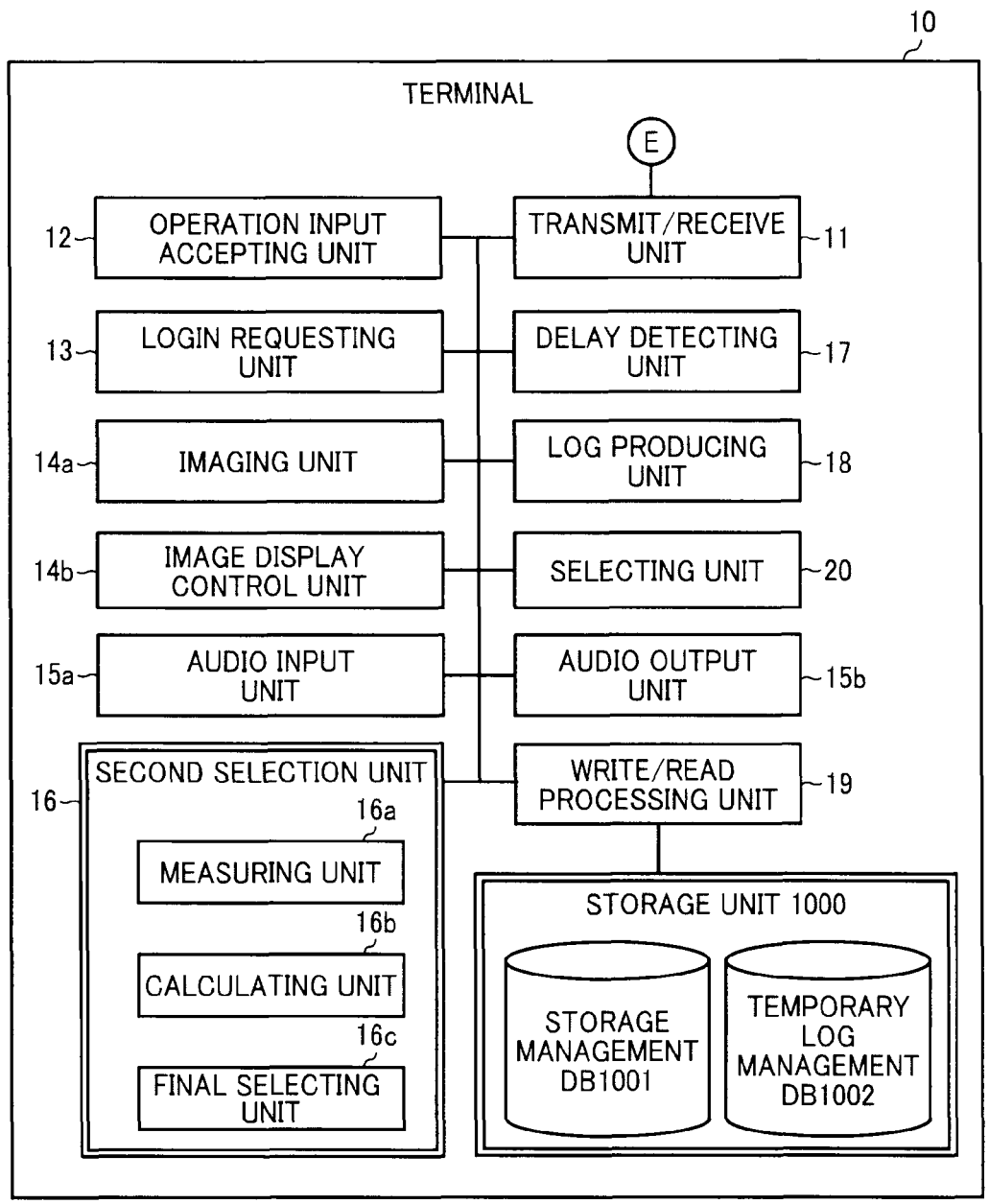

FIG. 3 is a hardware configuration diagram of the transmission management device according to one embodiment of the invention. The transmission management device 500 contains a CPU 201, which controls entire operation of the transmission management device 500; a ROM 202, which stores the transmission management device program; a RAM 203, which is used for work area of the CPU 201; a HD (Hard Disk) 204, which stores various data; a HDD (Hard Disk Drive) 205, which controls read-out or write-in of various data to the HD 204 subject to a control of the CPU 201; a media drive 207, which controls read-out or write-in (storing) of data to a recording medium 206 such as a flash memory; a display 208, which displays various information such as a cursor, a menu, a window, text, and images; a network I/F 209, which transmits data over the communication network 2; a keyboard 211, which has multiple keys that may be used to input a letter, a figure, or various directions; a mouse 212, which is used to select or to indicate various directions or a processing object, or to move a cursor; a CD-ROM drive 214, which controls read-out or write-in of data to a CD-ROM (Compact Disc Read Only Memory) 213 as an example of removable recording medium; and a bus line 210 such as an address bus or a data bus, which connects the above components electrically as illustrated in FIG. 3.

Furthermore, the transmission management device program described above may be stored in a computer-readable recording medium such as the recording medium 206 or the CD-ROM 213, in the form of a file that is installable or executable by a general-purpose computer, for distribution.

In this example, a hardware configuration of the log management device 550 is substantially similar to that of the transmission management device 500 described above, except that the ROM 202 stores the log management device program, which controls the log management device 550. In such case, the log management device program may be stored in a computer-readable recording medium such as the recording medium 206 or the CD-ROM 213, in the form of a file that is installable or executable by a general-purpose computer for distribution.

Further, in this example, a hardware configuration of the transmission approval data management device 570 is substantially similar to that of the transmission management device 500 described above, except that the ROM 202 stores the transmission approval data management device program, which controls the transmission approval data management device 570. In such case, the transmission approval data management device program may be stored in a computer-readable recording medium such as the recording medium 206 or the CD-ROM 213, in the form of a file that is installable or executable by a general-purpose computer, for distribution.

Further, a hardware configuration of the relaying device 30 is substantially similar to that of the transmission management device 500 described above, except that the ROM 202 stores the relaying device program, which controls the relaying device 30. In such case, the relaying device program may be stored in a computer readable recording medium such as the recording medium 206 or the CD-ROM 213, in the form of a file that is installable or executable by the general-purpose computer.

Further, a hardware configuration of the program providing system 90 is substantially similar to that of the transmission management device 500 described above, except that the ROM 202 stores the program providing system program, which controls the program providing system 90. In such case, the program providing system program may be stored in a computer readable recording medium such as the recording medium 206 or the CD-ROM 213, in the form of a file installable or executable by the general-purpose computer for distribution.

Furthermore, a hardware configuration of the maintenance system 100 is substantially similar to that of the transmission management device 500 described above, except that the ROM 202 stores the maintenance system program, which controls the maintenance system 100. In such case, the maintenance system program may be stored in a computer readable recording medium such as the recording medium 206 or the CD-ROM 213, in the form of a file installable or executable by the general-purpose computer for distribution.

Alternatively, any one of the above-described programs may be stored in any desired recording medium such as a CD-R (Compact Disc Recordable), a DVD (Digital Versatile Disk), or a Blue-ray™ disc for distribution.

<<Functional Configuration of this Embodiment>>

A functional configuration of this embodiment will be illustrated below. FIG. 4 is a functional block diagram of the terminal, device, and system of the transmission system 1 according to one embodiment of the invention. In FIG. 4, the terminal 10, the relaying device 30, and the transmission management system 50 are connected so as to transmit data with one another over the communication network 2. For simplicity, the program providing system 90 and the maintenance system 100 shown in FIG. 1 are omitted in FIG. 4.

<Functional Configuration of the Terminal>

The terminal 10 has a function to carry out a session to transmit the call data to another terminal. In addition, the terminal 10 has a function to transmit log data relating to the session to the transmission management system 50. In order to implement these functions, the terminal 10 contains a transmit/receive unit 11, an operation input accepting unit 12, a login requesting unit 13, an imaging unit 14a, an image display control unit 14b, an audio input unit 15a, an audio output unit 15b, a second selection unit 16, a delay detecting unit 17, a log producing unit 18, a write/read processing unit 19, and a selecting unit 20. Each unit corresponds to one or more functions or means, which may be implemented by any component shown in FIG. 2, run by commands from the CPU 101 that are generated in accordance with the program stored in the ROM 102 when the program is loaded onto the work area of the CPU 201. In addition, the terminal 10 contains a storage unit 1000, which is constructed by the SSD 105 shown in FIG. 2.

(Storage Management Table)

The storage unit 1000 includes a storage management DB (database) 1001, which stores a storage management table shown in FIG. 5. The storage management table manages priority data indicating the degree of priority in selecting the log management device as a destination of the log data from among two or more log management devices. The storage management table of FIG. 5 stores the priority data in association with a log management device ID (Identification) for identifying the log management device, an IP address of the log management device, log type data for indicating a type of the log data, and transmission approval data for indicating whether to transmit the log data having the specific log type to the specific log management device 550.

In this example, the log type data of the log data is determined based on the degree of priority of the log data that is to be transmitted to the log management device 550. The log type data "priority" indicates that the log data is to be transmitted in high priority. The log type data "general" indicates that the log data is not to be transmitted at least temporarily. In this example, the log type data includes all types of the log data other than the log type data "general". The log data, which is classified into each log type data, is stored in a predetermined storage area of the terminal 10. In this embodiment, the log data relating to "interruption of transmitting the audio data" or "interruption of transmitting the image data" is classified into the log type data "priority", and the other types of log data are classified to the log type data "general".

The transmission approval data "approval" indicates that the log data is to be transmitted from the terminal 10 to the log management device 550 instantly. The transmission disapproval data "disapproval" indicates that the log data is to be temporarily stored without being transmitted to the log management device 550. The storage management table shown in FIG. 5 indicates that the log management device having the degree of priority is "1", which is to be firstly selected by the terminal 10 as a destination to which the log data is to be transmitted, has the log management device ID of "A" and the IP address of "1.1.1.3". The table of FIG. 5 further indicates that the log data, which is classified into the log type data "priority", is to be transmitted to the log management device having the degree of priority "1".

(Temporary Log Management Table)

The storage unit 1000 further includes a temporary log management DB 1002, which stores a temporary log management table shown in FIG. 6. The temporary log management table of FIG. 6 stores a session ID for uniquely identifying a call data session in which the call data is transmitted to another terminal, the log data for indicating log or history of processes that are performed in relation to the call data session, and time information in association indicating the log data is generated, in association with one another.

<Functional Units of the Terminal>

Each functional unit of the terminal will be illustrated in detail. The transmit/receive unit 11 of the terminal 10, which is implemented by the network I/F 111 shown in FIG. 2, transmits and receives various data (information) to or from another terminal, device, or system over the communication network 2. The operation input accepting unit 12, which is implemented by the operation button 108 and the power switch 109 shown in FIG. 2, accepts various inputs from user. For instance, when the user turns on the power switch 109, the operation input accepting unit 12, shown in FIG. 4, receives a request for power-on and turns on the power.

The login requesting unit 13, which is implemented by commands from CPU 101 shown FIG. 2, automatically transmits login request data that requests for logging in process, and current IP address of a requester terminal 10, to the transmission management device 500 over the communication network 2 by the transmit/receive unit 11, for example, when the terminal 10 is powered on. In addition, when the user turns off the power switch 109, the transmit/receive unit 11 transmits state data indicating whether the terminal 10 is powered off or is made offline to the transmission management system 50. After the state data is transmitted, the operation input accepting unit 12 completely turns off the power of the terminal 10. In this way, the transmission management system 50 is able to know that the terminal 10 is turned off.

The imaging unit 14*a*, which is implemented by commands from the CPU 101 and by the camera 112 and the imaging device I/F 113 shown in FIG. 2, takes an image of an object to output image data. The image display control unit 14*b*, which is implemented by the display I/F 117 shown in FIG. 2, transmits the image data to the external display 120.

The audio input unit 15*a*, which is implemented by commands from CPU and by the audio input-output I/F 116 shown in FIG. 2, outputs the audio data on audio signal that is converted from user's voice by the microphone 114. The audio output unit 15*b*, which is implemented by commands from CPU and by the audio input-output I/F 116 shown in FIG. 2, outputs audio signal generated based on the audio data to the speaker 115 for output.

The second selection unit 16 includes a measuring unit 16*a*, a calculating unit 16*b*, and a second selecting unit 16*c*, and is implemented by commands from CPU 101 shown in FIG. 2 to select one relaying device 30 from among two or more relaying devices. The measuring unit 16*a* obtains a receipt date of preparatory transmit data when the preparatory transmit data is received by the transmit/receive unit 11. The calculating unit 16*b* calculates a lead time period, for each preparatory transmit data, whose receipt date is measured by the measuring unit 16*a*, from when the preparatory transmit data is transmitted by another terminal 10 to when the preparatory transmit data is received at the terminal 10. The lead time is calculated based on the difference between the receipt date measured by the measuring unit 16*a* and a transmission date included in each preparatory transmit data. The second selecting unit 16*c* selects one relaying device 30 that relays the preparatory transmit data at the shortest lead time, calculated by the calculating unit 16*b*.

The delay detecting unit 17, which is implemented by commands from CPU 101 shown in FIG. 2, detects delay time (ms) of the image data or the audio data that is sent from another terminal 10 via the relaying device 30.

The log producing unit 18, which is implemented by commands from CPU 101 shown in FIG. 2, produces the log data relating to a call session that is established with another terminal that is accepted by the operation input accepting unit 12. The selecting unit 20, which is implemented by commands from CPU 101 shown in FIG. 2, selects the log management device as a destination of the log data produced by the log producing unit 18 based on the transmission approval data and the priority data that are managed by the storage management table (FIG. 5).

The write/read processing unit 19, implemented by commands from CPU 101 and SSD 105 shown in FIG. 2, stores various data to the storage unit 1000 or reads out various data stored in the storage unit 1000. For example, the storage unit 1000 stores a terminal ID that identifies the terminal 10, a password, the image data, and the audio data. Further, the image data and the audio data are overwritten in the storage unit 100 every time the data are received for transmission from the terminal to the destination terminal. The display 120 displays an image based on the image data that is read out from the storage unit 1000 before the image data is overwritten. The speaker 115 outputs audio based on the audio data that is read out from the storage unit 1000 before the image data is overwritten.

In this embodiment, the terminal ID, the log management device ID, or a relaying device ID described below may be expressed in terms of a character of any language, a letter, a code, or a sign as long as it uniquely identifies a specific terminal 10, log management device 550, or relaying device 30. Further, the terminal ID, the log management device ID, or the relaying device ID may be a combination of at least two of a character of any language, a letter, a code, and a sign.

<Functional Configuration of the Relaying Device>

Next, a functional structure of the relaying device 30 will be described. The relaying device 30 includes a transmit/receive unit 31, a state detection unit 32, a data quality checking unit 33, a change quality managing unit 34, a data quality changing unit 35, and a write/read processing unit 39. Each unit corresponds to one or more functions or means, which may be implemented by any component shown in FIG. 3, run by commands from the CPU 201 in accordance with the program stored in the ROM 202, when the program is loaded onto the work area of the CPU 201. The relaying device 30 further includes a storage unit 3000, which is constructed by the HD 204 shown in FIG. 3.

(Change Quality Management Table)

The storage unit 3000 includes a change quality management DB 3001, which stores a change quality management table shown in FIG. 8. The change quality management table stores an IP address of the terminal 10 as a destination to which the image data is relayed, in connection with an image quality of the image data to be relayed from the relaying device 30 to the relaying destination.

The image data in this embodiment has a plurality of types of image data having different resolutions. The low resolution image, which functions as a base image, has 160 pixels in the horizontal direction and 120 pixels in the vertical direction as shown in FIG. 7*a*. The medium resolution image has 320 pixels in the horizontal direction and 240 pixels in the vertical direction as shown in FIG. 7*b*. The high resolution image has 640 pixels in the horizontal direction and 480 pixels in the vertical direction as shown as in FIG. 7C. When the data is transmitted through a narrow band channel, only low quality image data having the low resolution image data as a base image, is relayed. When the data is transmitted through a relatively broad band channel, medium quality image data having low resolution image data as a base image and medium resolution image data, are relayed. When data is transmitted through a very broad band channel, high quality image data having low resolution image data as a base image, medium quality image data, and high quality image data, are relayed. For instance, in the change quality management table shown in FIG. 8, when the relaying device 30 relays the image data to the destination terminal 10, which has an IP address of "1.3.2.4", a quality of the image data (image quality), which is relayed, is "high."

<Functional Units of the Relaying Device>

Next, a functional structure of the relaying device 30 will be illustrated. In illustrating the functional units of the relaying device 30, a relationship with a hardware configuration shown in FIG. 3, which implements each unit of the relaying device 30, will be also illustrated.

The transmit/receive unit 31 of the relaying device 30 shown in FIG. 4, which is implemented by the network I/F 209 shown in FIG. 3, transmits and receives various data or information to or from another terminal, device, or system over the communication network 2. The state detection unit 32, which is implemented by commands from CPU 201 shown in FIG. 3, detects an operating state of the relaying device 30 having the state detection unit 32. The operating state is, for example, "on-line," "off-line," or "failure".

The data quality checking unit 33, which is implemented by commands from CPU 201 shown in FIG. 3, retrieves the change quality management table (FIG. 8) by the IP address of the destination terminal as a retrieval key to extract a corresponding image quality of the image data to be relayed. In this manner, the data quality checking unit 33 checks the image quality of the image data to be relayed. The change quality managing unit 34, which is implemented by commands from CPU 201, changes contents of the change quality management DB 3001 based on quality data illustrated below, which is transmitted from the transmission management device 500. The relaying device 30 lowers the image quality of the image data to be relayed, from high quality image to medium quality image, when the delay of the image data, which is received at the destination terminal (terminal 10db), occurs. For example, it is assumed that the requester terminal (terminal 10bb) starts videoconference with the destination terminal (terminal 10cb) over the communication network 2, when the requester terminal (terminal 10aa) with the terminal ID "01aa" and the destination terminal (terminal 10db) with the terminal ID "01db" are carrying out videoconference while transmitting the high quality image data. In such case, the contents of the change quality management DB 3001 is changed in a manner to lower the image quality of the image data to be relayed by the relaying device, from high quality image to medium quality image.

The data quality changing unit 35, which is implemented by commands from CPU 201 shown in FIG. 3, changes the image quality of the image data transmitted from the terminal, based on the changed contents of the change quality management DB 3001. The write/read processing unit 39, which is implemented by the HDD 205 shown in FIG. 3, stores various data to the storage unit 3000 and to read out various data stored in the storage unit 3000.

<Functional Configuration of the Transmission Management Device>

Next, functions or operations performed by the transmission management device 500 will be illustrated. The transmission management device 500 includes a transmit/receive unit 501, a terminal authenticating unit 502, a state managing unit 503, a terminal extracting unit 504, a terminal state obtaining unit 505, a primary selection unit 506, a session managing unit 507, a quality determining unit 508, a write/read processing unit 509, and a delay time managing unit 510. Each unit corresponds to one or more functions or means, which may be implemented by any component shown in FIG. 3, run by commands from the CPU 201 in accordance with the program stored in the ROM 202 when loaded onto the work area of the CPU 201. In addition, the transmission management device 500 includes a storage unit 5000, which is constructed by the HD 204 shown in FIG. 3.

(Relaying Device Management Table)

The storage unit 5000 includes a relaying device management DB 5001, which stores a relaying device management table shown in FIG. 9. The relaying device management table stores a relaying device ID of each relaying device 30, an operating state of the relaying device 30, a receipt date when the transmission management device 500 received the state data indicating an operating state, an IP address of the relaying device 30, and a maximum data transmission rate (Mbps) of the relaying device 30, in association with one another. For instance, in the relaying device management table shown in FIG. 9, it is shown that an operating state of the relaying device 30a, which has the relaying device ID "111a", is "on-line"; the transmission management device 500 received the state data at 13:00 Nov. 10, 2009; and the IP address of the relaying device 30a is "1.2.1.2"; and the maximum data transmission rate of the relaying device 30a is 100 Mbps.

(Terminal Authentication Management Table)

The storage unit 5000 includes a terminal authentication management DB 5002, which stores a terminal authentication management table shown in FIG. 10. The terminal authentication management table stores, for each of a plurality of terminals that are managed by the transmission management device 500, a terminal ID and a password. For instance, in the terminal authentication management table shown in FIG. 10, it is shown that the password of the terminal 10aa having the terminal ID "01aa" is "aaaa".

(Terminal Management Table)

The storage unit 5000 includes a terminal management DB 5003, which stores a terminal management table shown in FIG. 11. The terminal management table stores the terminal ID of each terminal 10, an operating state of the terminal 10, a receipt date at which the transmission management device 500 received login request data described below, and an IF address of the terminal 10, in association with one another. For instance, in the terminal management table shown in FIG. 11, it is shown that the operating state of the terminal 10aa, which has a terminal ID "01aa", is "on-line"; the transmission management device 500 received the login request data at 13:40 Nov. 10, 2009; and the IP address of the terminal 10aa is "1.2.1.3".

(Address List Management Table)

The storage unit 5000 includes an address list management DB 5004, which stores an address list management table shown in FIG. 12. The address list management table stores the terminal ID of the requester terminal requesting to start a videoconference, in connection with the terminal ID of the destination terminal that is registered as a candidate of the destination terminal. For instance, in the address list management table shown in FIG. 12, it is shown that the candidate of the destination terminal, that may be requested by the requester terminal (terminal 10aa) to start a videoconference, includes the terminal 10ab having the terminal ID "01ab", the terminal 10ba having the terminal ID "01ba", and the terminal 10db having the terminal ID "01db". The candidate of the destination terminal may be updated based on a request for addition or elimination, which is received from the requester terminal at the transmission management device 500.

(Session Management Table)

The storage unit 5000 includes a session management DB 5005, which stores a session management table shown in FIG. 13. The session management table stores a session ID for identifying a session to transmit the call data between terminals, a relaying device ID of the relaying device 30 to be used to relay the image data and the audio data, the terminal ID of the requester terminal, the terminal ID of the destination terminal, delay time (ms) of receipt when the destination terminal receives the image data, and a receipt date at which the transmission management device 500 received the delay data from the requester terminal, in association with one another. For instance, in the session management table shown in FIG. 13, it is shown that the relaying device 30a (relaying device ID "111a"), which is selected for the session assigned with the session ID "se1", relays the image data and the audio data between the requester terminal (terminal 10aa) having the terminal ID "01aa" and the destination terminal (terminal 10db) having the terminal ID "01db"; the delay time of the image data at the destination terminal (terminal 10db) is 200 (ms) at 14:00 Nov. 10, 2009. When two terminals 10 carry on videoconference, the receipt date of the delay data may be managed based on the delay data that is transmitted from the requester terminal, in alternative to the delay data that is transmitted from the destination terminal. However, when three or more terminals 10 carry on videoconference, the receipt date of the delay data is managed based on the delay data transmitted from the destination terminal of the image data and the audio data.

(Address Priority Management Table)

The storage unit 5000 includes a priority management DB 5006, which stores an address priority management table shown in FIG. 14. The address priority management table manages an address priority point, which increases in number based on whether four groups of dot addresses in the IP address compliant with IPv4 are similar between the terminal 10 and the relaying device 30. For instance, the address priority management table shown in FIG. 14 indicates that, when the three highest dots of the IP address are the same between the terminal 10 and the relaying device 30, the address priority point is "5". When the two highest dots of the IP addresses are the same between the terminal 10 and the relaying device 30, the address priority point is "3". In this case, the address priority point is not affected by whether the value of the lowest dots of the IP addresses are the same or not. When the highest one dot of the IP addresses are the same between the terminal 10 and the relaying device 30, the address priority point is "1". In this case, the address priority point is not affected by whether the lower two dots of the IP address are the same or not. When the value of the highest one dots of the IP addresses are different, the address priority point is "0". In this case, the address priority point is not affected by whether the lower three dots of the IP address are the same or not.

(Transmission Rate Priority Management Table)

The storage unit 5000 includes a priority management DB 5006, which stores a transmission rate priority management table shown in FIG. 15. The transmission rate priority management table manages a transmission rate priority point, which increases in number depending on a value of the maximum data transmission rate (Mbps) at the relaying device 30. For instance, in the transmission rate priority management table shown in FIG. 15, when the maximum data transmission rate is equal to or more than 1000 Mbps at the relaying device 30, the transmission rate priority point is "5". When the maximum data transmission rate is equal to or more than 100 Mbps and less than 1000 Mbps at the relaying device 30, the transmission rate priority point is "3". When the maximum data transmission rate is equal to or more than 10 Mbps and less than 100 Mbps at the relaying device 30, the transmission rate priority point is "1". When the maximum data transmission rate is less than 10 Mbps at the relaying device 30, the transmission rate priority point is "0".

(Quality Management Table)

The storage unit 5000 includes a quality management DB 5007, which stores a quality management table shown in FIG. 16. The quality management table manages an image quality of the image data to be relayed by the relaying device 30, depending on delay time (ms) of the image data at the requester terminal or the destination terminal.

<Functional Units of the Transmission Management Device>

Next, a functional structure of the transmission management device 500 will be illustrated in detail. In illustrating the functional units of the transmission management device 500, a relationship with a hardware configuration shown in FIG. 3, which implements each unit of the transmission management device 500, will be also illustrated.

The transmit/receive unit 501, which is implemented by the network I/F 209 shown in FIG. 3, transmits or receives various data or information to or from another terminal, device, or system over the communication network 2. The terminal authenticating unit 502 authenticates the terminal by retrieving the terminal authentication management table in the storage unit 5000 by the terminal ID and the password, which are included in the login request data, as retrieval keys, to evaluate whether the same terminal ID and the password are stored in the terminal authentication management table. The state managing unit 503 stores the terminal ID of the requester terminal, the operating state of the requester terminal, and the receipt date at which the transmission management device 500 receives the login request data, in order to manage the operating state of the requester terminal which requested login.

The terminal extracting unit 504 extracts the terminal ID by retrieving the address list management table (FIG. 12) by the terminal ID of the requester terminal, which requested login, as a retrieval key to read out the terminal ID of a candidate destination terminal to which the requester terminal may request for videoconference. In addition, the terminal extracting unit 504 extracts the terminal ID of another requester terminal, which registered the terminal ID of the requester terminal as the candidate destination terminal, by retrieving the address list management table by the terminal ID of the requester terminal, which requested login, as a retrieval key.

The terminal state obtaining unit 505 retrieves the terminal management table (FIG. 11) by using the terminal ID that is extracted as a terminal ID of a candidate of the destination terminal by the terminal extracting unit 504 as a retrieval key to read out the operating state corresponding to each terminal ID. In this way, the terminal state obtaining unit 505 may obtain the state of the candidate destination terminal and transmit to the requester terminal. In addition, the terminal state obtaining unit 505 obtains the operating state of the requester terminal, which requested login, by retrieving the terminal management table by the terminal ID, which is extracted by the terminal extracting unit 504, as a retrieval key.

The primary selection unit 506 includes a session ID generating unit 506a, a terminal IP address extracting unit 506b, a primary selecting unit 506c, and a priority determining unit 506d. The primary selection unit 506 narrows down a number of the relaying devices to prepare for narrowing processing to be later performed in order to select one relaying device 30 from among two or more relaying devices 30. The session ID generating unit 506a generates a session ID, which identifies a session to transmit the call data between terminals. The terminal IP address extracting unit 506b retrieves the terminal management table (FIG. 11) based on the terminal ID of the requester terminal and the terminal ID of the destination terminal, which are included in call start request data transmitted from the requester terminal, to extract the IP address corresponding to each terminal. The primary selecting unit 506c selects the relaying device 30 by selecting the relaying device ID corresponding to the operating state "on-line" from among the relaying devices 30 managed in the relaying device management table (FIG. 9).

In addition, the primary selecting unit 506c retrieves the relaying device management table (FIG. 9) by the IP address of the requester terminal and the IP address of the destination terminal, which are respectively extracted by the terminal IP address extracting unit 506b, to evaluate whether each dot address in each IP address of the requester terminal or the destination terminal is the same to that of the selected relaying device 30. In addition, the primary selecting unit 506c selects the relaying device 30 by selecting two relaying devices 30 each having the highest combination points. The combination point is calculated by adding the address priority point and the speed priority point.

In this embodiment, two relaying devices 30 having the highest combination points are selected. However, three or more relaying devices 30 having the highest or higher combination points may be selected.

The priority determining unit 506d refers to the address priority management table (FIG. 14) to determine the address priority point for each relaying device 30, which is evaluated by the primary selecting unit 506c. In addition, the priority determining unit 506d retrieves the transmission rate priority management table (FIG. 15) by the maximum data transmission rate of each relaying device 30, which is managed in the relaying device management table (FIG. 9), to determine the transmission rate priority point for each relaying device 30 that are selected by the primary selecting unit 506c.

The session managing unit 507 stores, in connection with the session ID that is generated by the session ID generating unit 506a, the terminal ID of the requester terminal, and the terminal ID of the destination terminal, in the session management table (FIG. 13) of the storage unit 5000. In addition, the session managing unit 507 stores the relaying device ID of one relaying device 30, which is selected by the second selecting unit 16c of the terminal 10, in connection with session ID to the session management table.

The quality determining unit 508 determines the image quality of the image data to be relayed by the relaying device 30, by retrieving the quality management table (FIG. 16) using the delay time as a retrieval key to extract corresponding image quality of the image data. The write/read processing unit 509, implemented by the HDD 205 shown in FIG. 3, stores various data to the storage unit 5000 or reads out various data stored in the storage unit 5000. The delay time managing unit 510 retrieves the terminal management table (FIG. 11) using the IP address of the destination terminal as a retrieval key to extract corresponding terminal ID. In addition, The delay time managing unit 510 stores the delay time, shown in the delay data, in the field of the delay time on the record including the extracted terminal ID in the session management table (FIG. 13).

<Functional Configuration of the Log Management Device>

Next, a function structure of the log management device 550 will be illustrated. The log management device 550 includes a transmit/receive unit 551, an event detecting unit 552, and a write/read processing unit 559. Each of these units of the log management device 500 corresponds to one or more functions or means, which may be implemented by any component shown in FIG. 3, run by commands from the CPU 201, in accordance with the program stored in the ROM 202 when the program is loaded onto the work area of the CPU 201. The log management device 550 further includes a storage unit 5500, which is constructed by the HD 204 shown in FIG. 3.

(Log Management Table)

The storage unit 5500 includes a log management DB 5001, which stores a log management table shown in FIG. 17. The log management table of FIG. 17 is generated for each one of the terminals 10 having a specific terminal ID. The log management table of FIG. 17 stores, for a log ID for identifying the log data, the log data, the session ID, and date management data, in association with one another. The log data indicates a log or history of processes that are performed in relation to a specific session in which the call data is transmitted between the terminals. Examples of the log data include, but not limited to, "invite" for requesting to start the session to transmit the call data between the terminals, "bye" for terminating the session, "login" for requesting login to the transmission management device 500, "logout" for requesting logout from the transmission management device 500, and "cancel" for canceling the request. The session ID is any identification to uniquely identify the session to transmit the call data between the terminals. The date management data indicates the date and time to be managed in connection with the log data, such as the date and time at which the log data is received.

<Functional Units of the Log Management Device>

Next, a functional structure of the log management device 550 will be described in detail. In illustrating the functional units of the log management device 550, a relationship with a hardware configuration shown in FIG. 3, which implements each unit of the log management device 550, will be also illustrated.

The transmit/receive unit 551, which is implemented by the network I/F 209 shown in FIG. 3, transmits or receives various data or information to or from another terminal, device, or system over the communication network 2. The event detecting unit 552 detects a predetermined event of the log management device 550 to generate a detection result. The event detecting unit 552 produces detection result data based on the detection result. In this example, the predetermined event includes any event that may cause an error in managing log data that has been already or may be additionally stored in the log management DB 5501, such as an event indicating the failure, error, or busy state of the log management device 550, an event relating to maintenance of the log management device 550, or an event indicating a failure on the network connecting to the log management device 550. When the event detecting unit 552 detects the event, it produces the detection result data based on the detection result. The write/read processing unit 559, which is implemented by the HDD 205 shown in FIG. 3, stores various data in the storage unit 5500 or reads out various data stored in the storage unit 5500.

<Functional Configuration of the Transmission Approval Data Management Device>

Next, a functional structure of the transmission approval data management device 570 will be illustrated. The transmission approval data management device 570 includes a transmit/receive unit 571, a determining unit 572, a comparing unit 573, and a write/read processing unit 579. Each unit corresponds to one or more functions or means, which may be implemented by any component shown in FIG. 3, run by commands from the CPU 201 that are generated in accordance with the program stored in the ROM 202 when the program is loaded onto the work area of the CPU 201. The transmission approval data management device 570 further includes a storage unit 5700, which is constructed by the HD 204 shown in FIG. 3.

(Detection Result Data Management Table)

The storage unit 5700 includes a detection result data management DB 5701, which stores a detection result data management table shown in FIG. 18. The detection result data management table of FIG. 18 stores detection result data, which may be produced by the event detecting unit 552 of the log management device 550 based on the detection result of the predetermined event. For each of the detection result data, the detection result data management table of FIG. 18 stores log type data indicating a type of the log data, and transmission approval data indicating whether to cause the terminal 10 to transmit the log data to the log management device 550. In this example, the detection result data includes "error" result data that is generated based on the detection result indicating that the occurrence of an error at the log management device 550, "busy" result data that is generated based on the detection result indicating that the log management device 550 is in the busy state, and "none" result data that is generated based on the detection result indicating that none of the predetermined events is detected at the log management device 550. For example, the detection result data management table shown in FIG. 18 indicates that, when the detection result generated by the event detecting unit 552 is the "busy" result data indicating the busy state of the log management device 550, the terminal 10 is caused to transmit only the log data classified into the log type "priority" to the log management device 550.

(Device Management Table)

The storage unit 5700 further includes a device management DB 5702, which stores a device management table shown in FIG. 19. The device management table of FIG. 19 stores a log management device ID for identifying the log management device 550, an IP address of the log management device 550, the log type data, and the transmission approval data. The device management table shown in FIG. 19 indicates that the IP address of the log management device having the log management device ID "A" and the IP address of "1.1.1.3" functions as a log management device that receives the log data that is classified to the "priority" type from the terminal 10.

(Destination Terminal Management Table)

The storage unit 5700 further includes a destination terminal management DB 5703, which stores a destination terminal management table shown in FIG. 20. The destination terminal management table of FIG. 20 stores a destination terminal ID for identifying a destination terminal 10 to which the transmission approval data is to be transmitted and a terminal IP address of the destination terminal 10, in association with a log management device ID for identifying one or more log management devices 550 to which the log data of the destination terminal 10 is transmitted based on the transmission approval data. The destination terminal 10 to which the transmission approval data is to be transmitted is identified based on the device management table of FIG. 19, which is created for each one of the terminals 10 that are subjected for management by the transmission system 1. For example, the destination terminal management table shown in FIG. 20 indicates that the transmission approval data regarding the log management device 550 having the terminal ID "A" is to be transmitted to a destination terminal having the terminal ID "01$aa$" and a destination terminal having the terminal ID "01$ab$".

<Functional Units of the Transmission Approval Data Management Device>

Next, a functional structure of the transmission approval data management device 570 will be described in detail. In illustrating each functional unit of the transmission approval data management device 570, a relationship with a hardware configuration shown in FIG. 3, which implements one or more units of the transmission approval data management device 570, will be also illustrated.

The transmit/receive unit 571, which is implemented by the network I/F 209 shown in FIG. 3, transmits and receives various data or information to or from another terminal, device, or system over the communication network 2. The determining unit 572 determines whether the terminal 10 should transmit the log data to the log management device 550 based on the detection result data received from the log management device 550 to generate transmission approval data. The comparing unit 573 compares the transmission approval data that is currently determined by the determining unit 552 with transmission approval data stored in the device management table (FIG. 19). The write/read processing unit 579, implemented by the HDD 205 shown in FIG. 3, stores various data to the storage unit 5700 and reads out various data stored in the storage unit 5700.

<<Processing or Operation of this Embodiment>>

Figure 21:
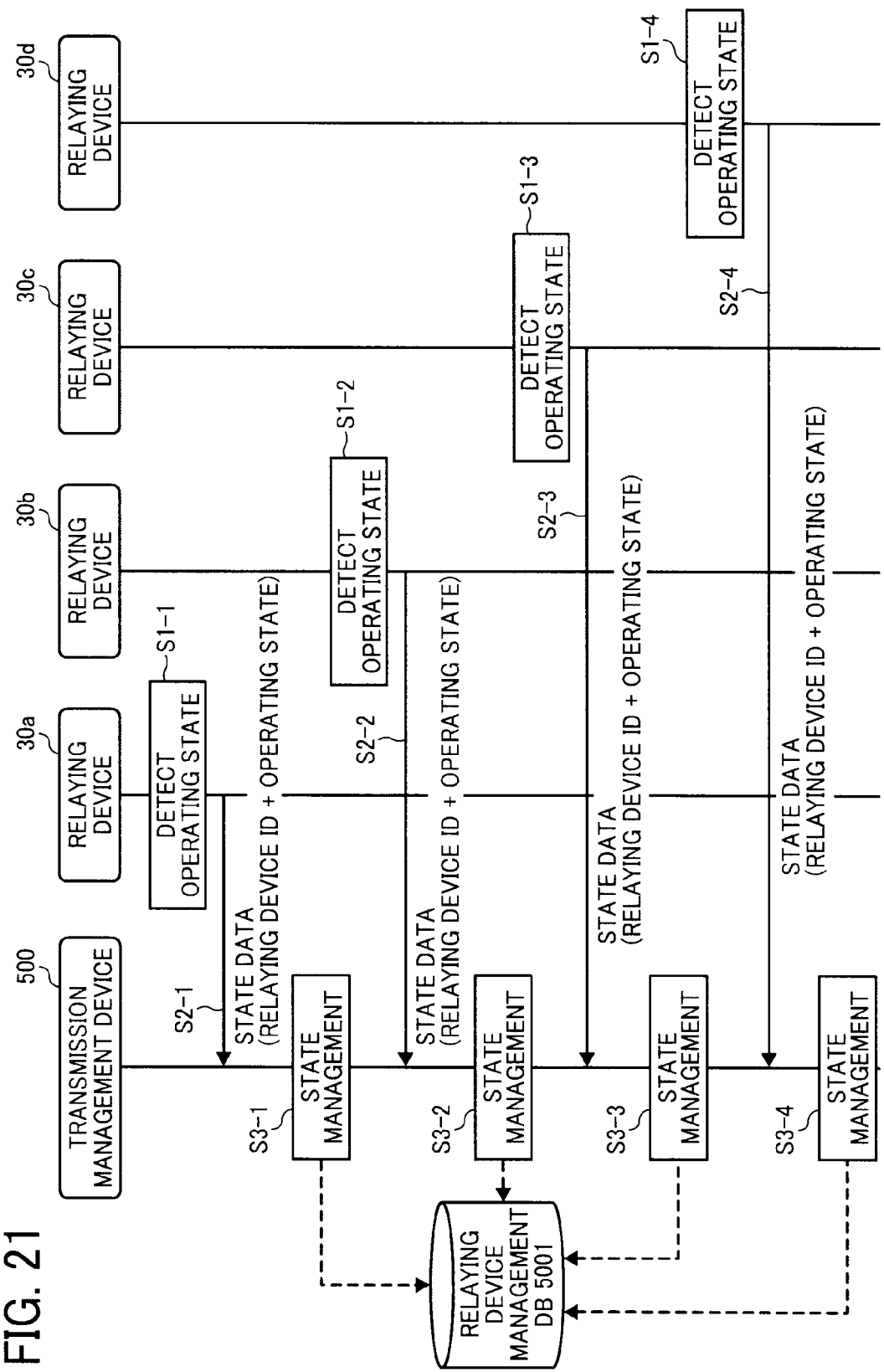
FIG. 21 is a sequential diagram illustrating operation of managing state data indicating an operating state of a relaying device.
Figure 22:
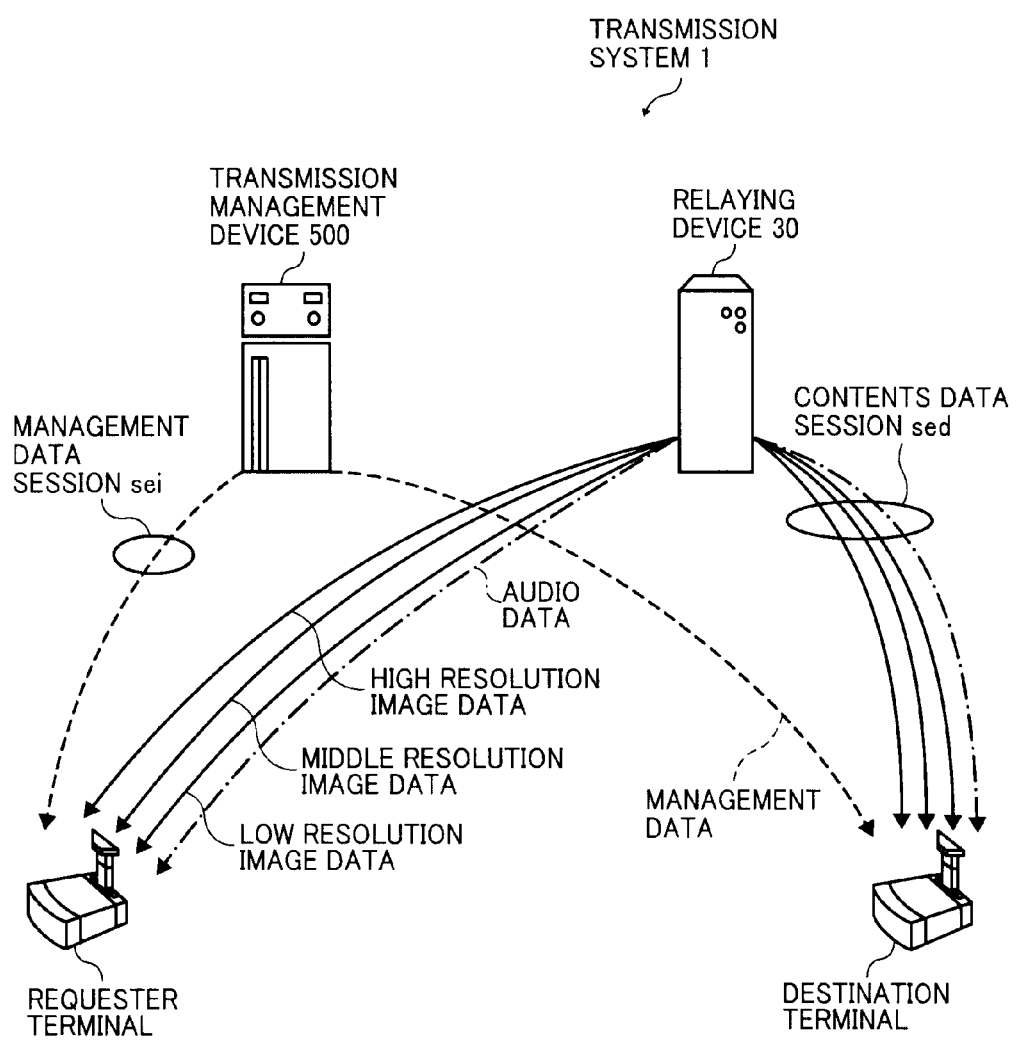
FIG. 22 is a conceptual diagram illustrating transmission or reception of data in the transmission system of FIG. 1.
Figure 23:
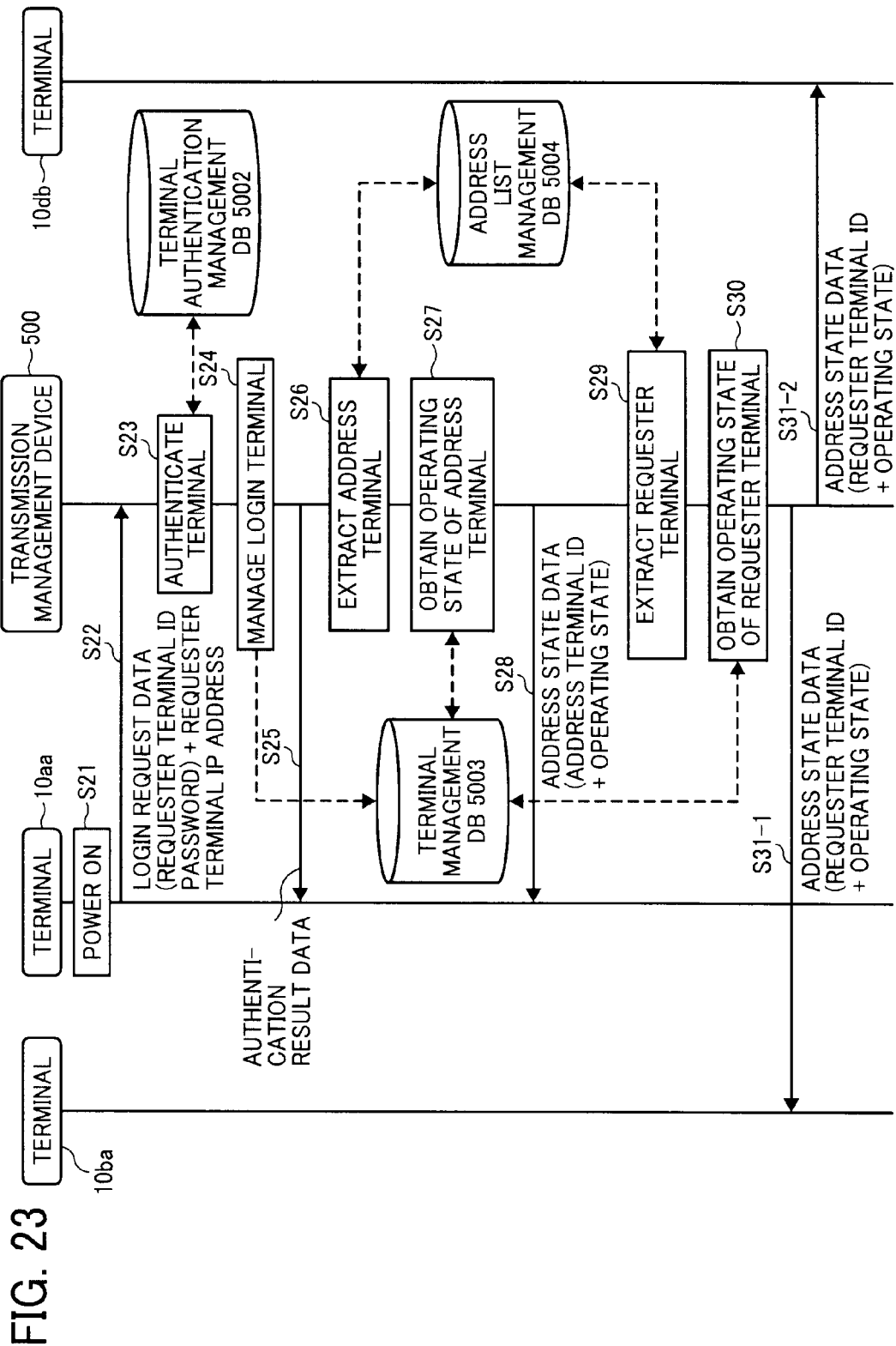
FIG. 23 is a sequential diagram illustrating operation of preparing before starting communication between transmission terminals.
Figure 24:
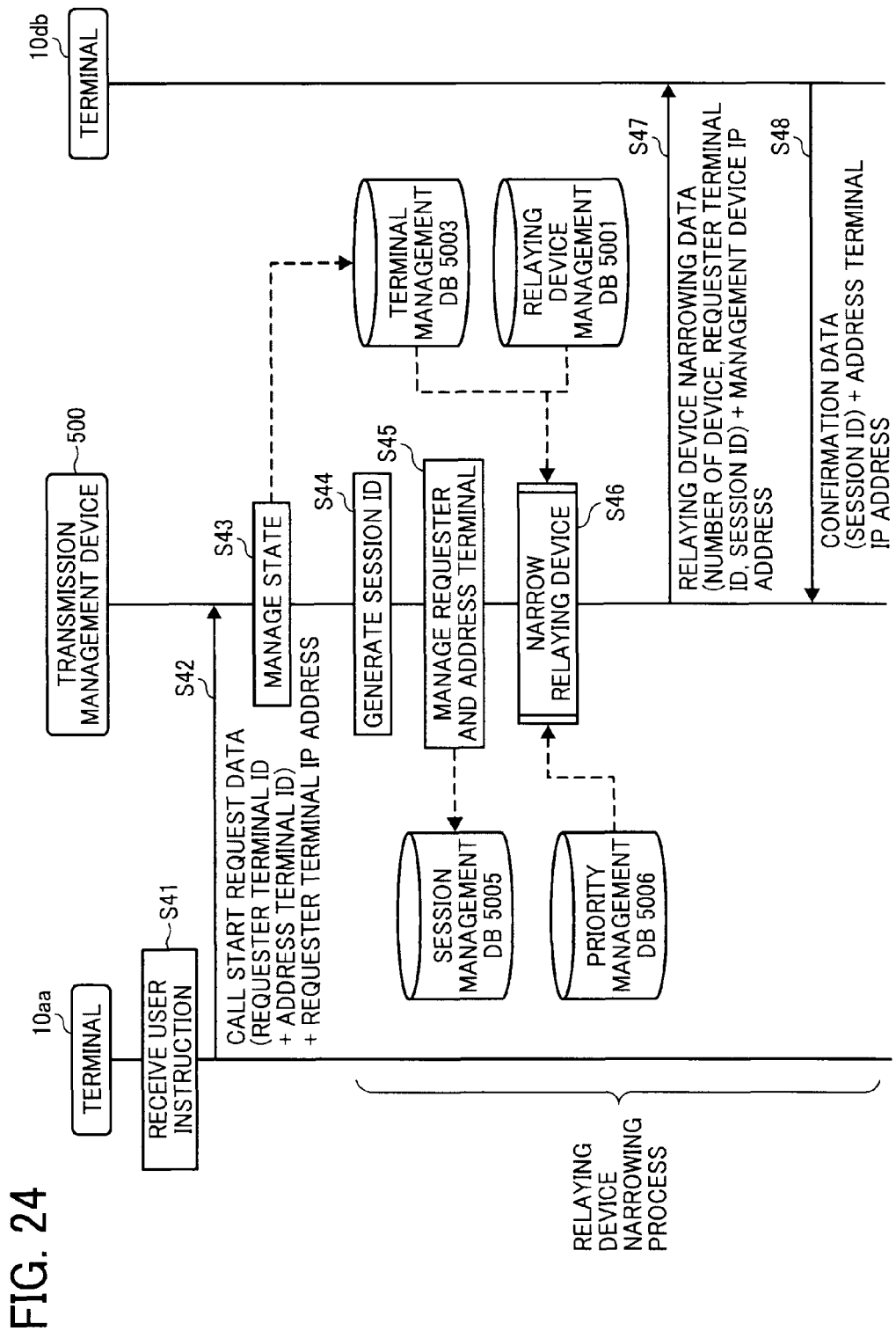
FIG. 24 is a sequential diagram illustrating operation of narrowing down a number of relaying devices.
Figure 25:
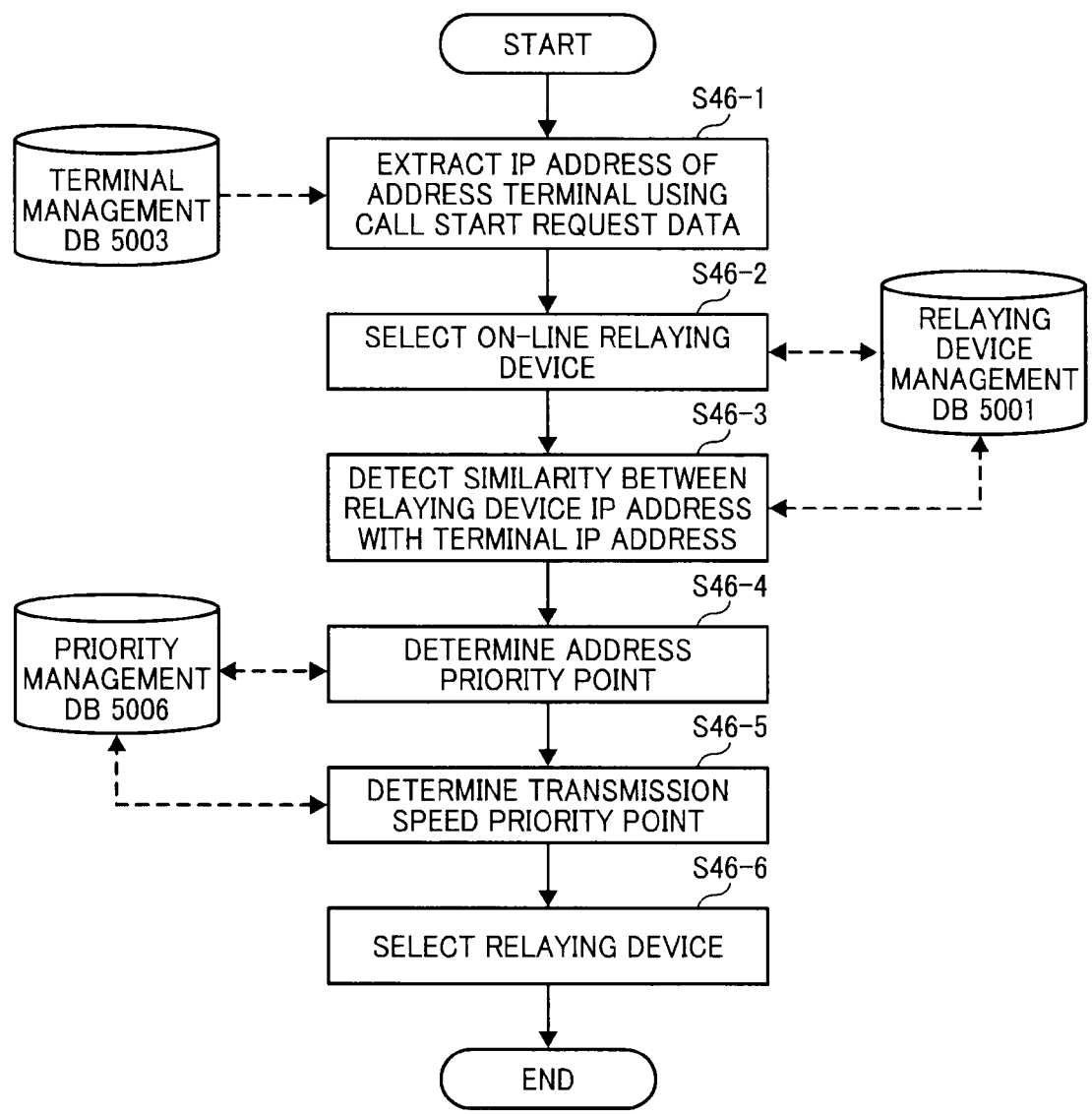
FIG. 25 is a flowchart illustrating operation of narrowing down a number of relaying devices.
Figure 28:
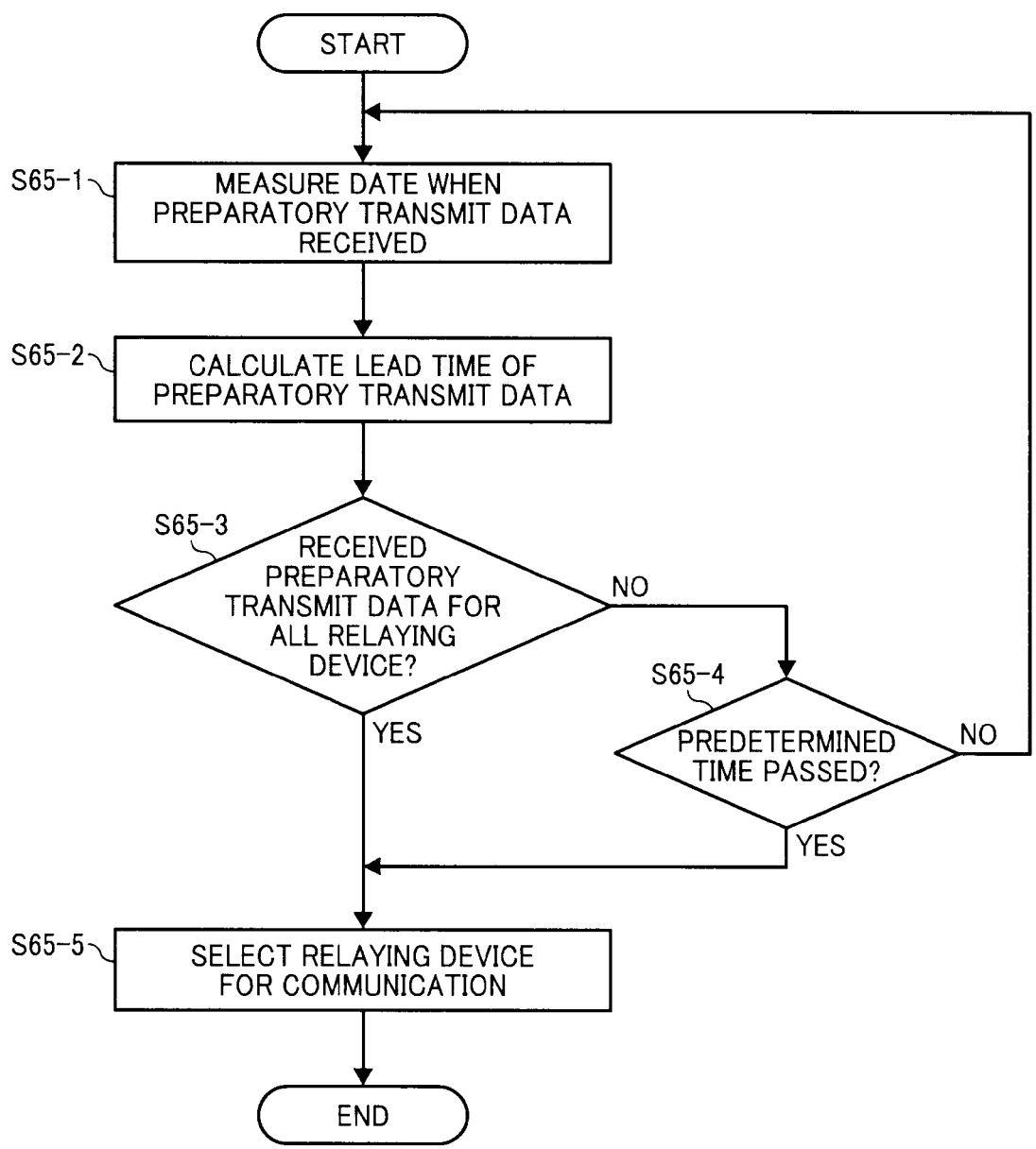
FIG. 28 is a flowchart illustrating operation of selecting a relaying device at a transmission terminal.
Figure 29:
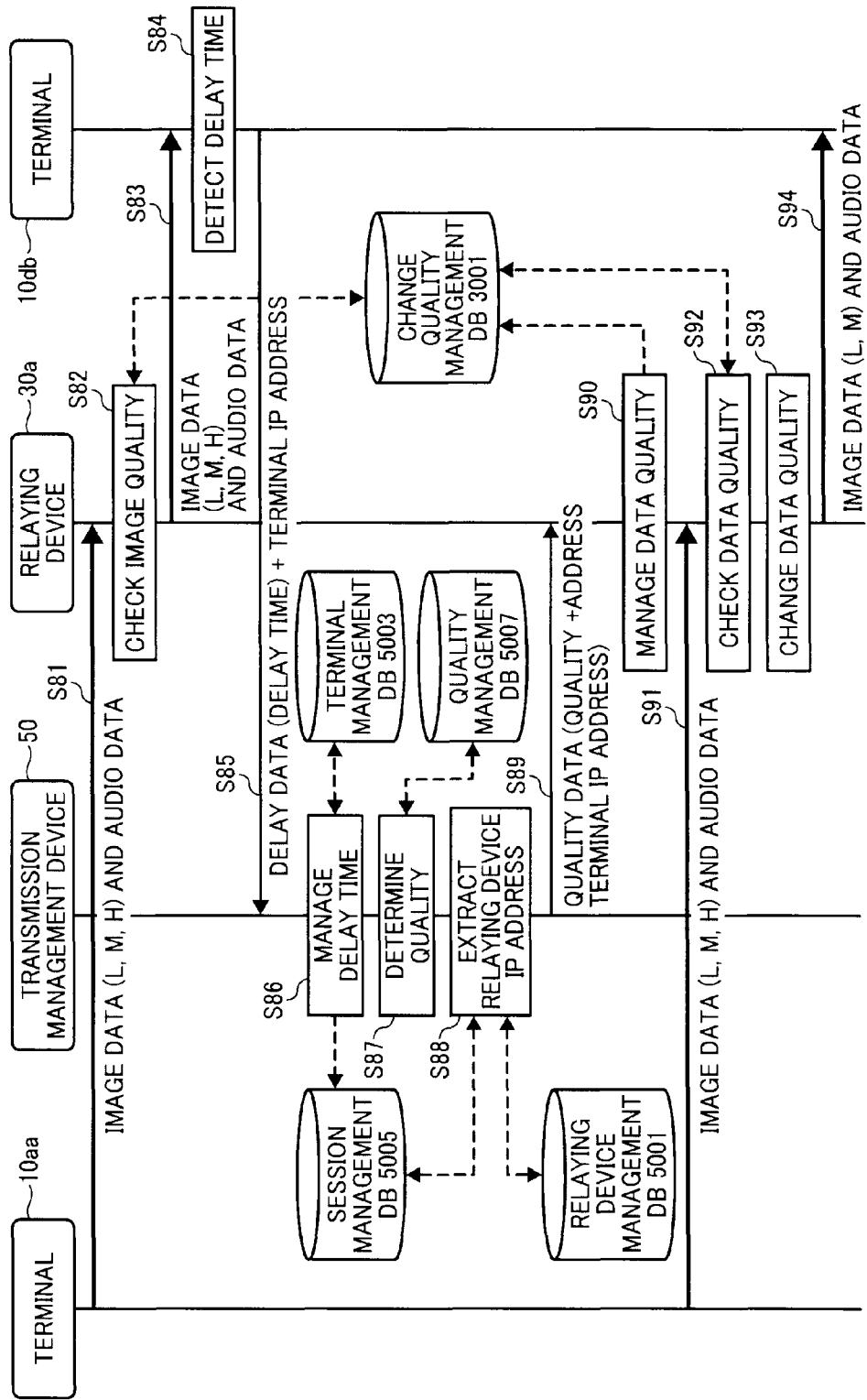
FIG. 29 is a sequential diagram illustrating operation of transmitting and receiving image data and audio data between transmission terminals.
Figure 30:
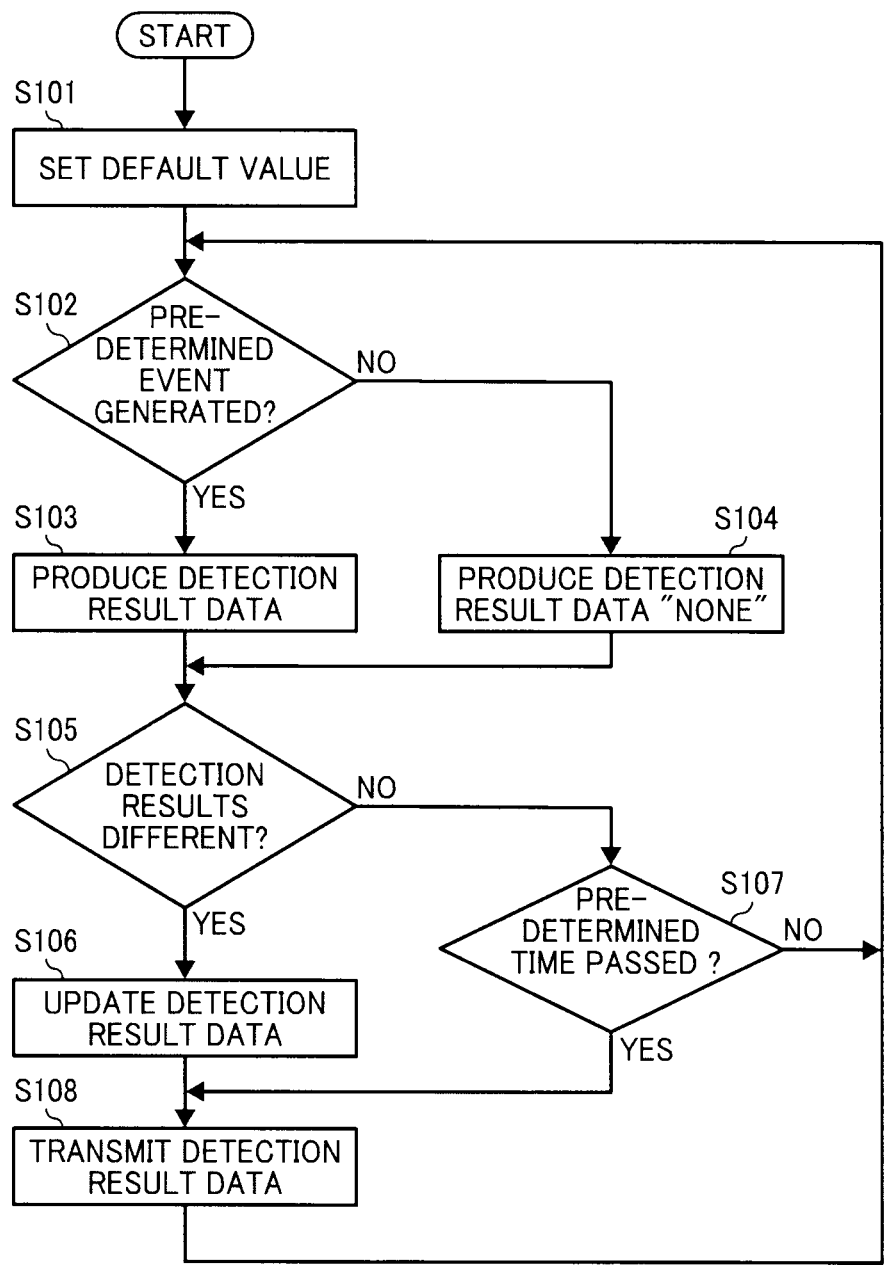
FIG. 30 is a flowchart illustrating operation of transmitting detection result data, performed by a log management system.
Figure 31:
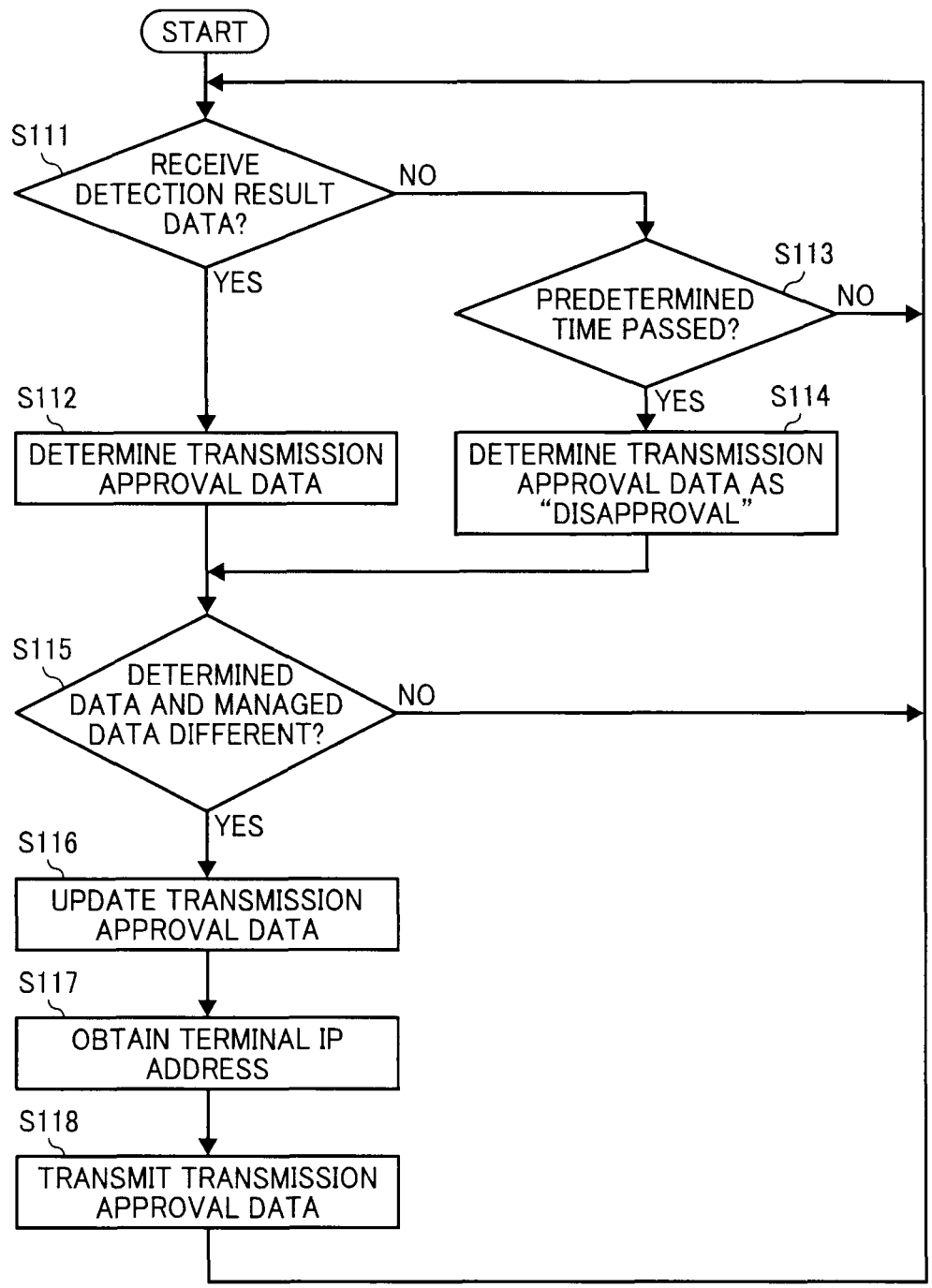
FIG. 31 is a flowchart illustrating operation of transmitting transmission approval data.
Figure 32:
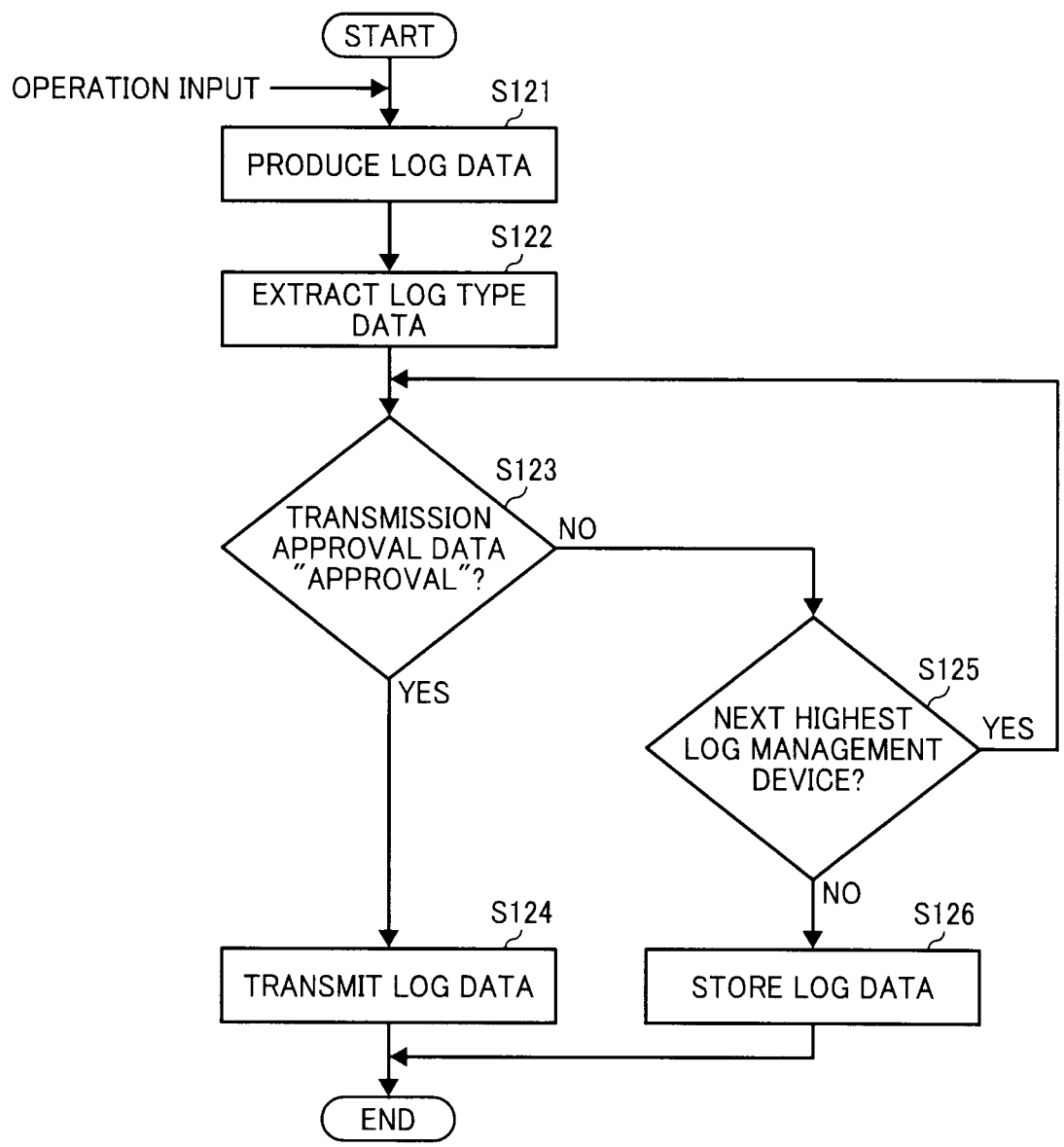
FIG. 32 is a flowchart illustrating operation of transmitting or storing log data, performed by a transmission terminal.
Figure 33:
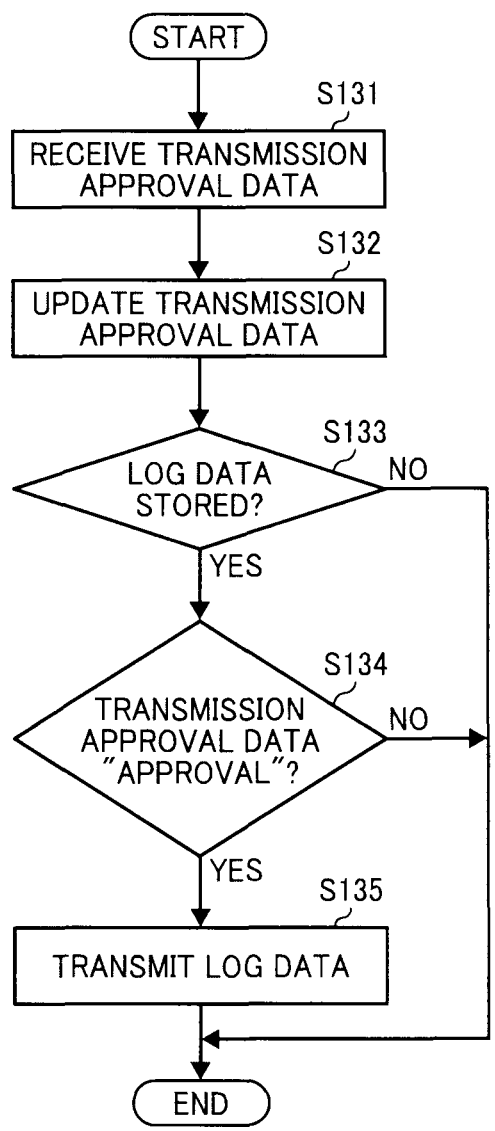
FIG. 33 is a flowchart illustrating operation of transmitting log data to a transmission management device, performed by a transmission terminal.

Subsequently, processing or operation of the transmission system 1 of this embodiment will be illustrated with FIG. 21 to FIG. 33. FIG. 21 is a sequential diagram that illustrates steps in a process of managing state data, which shows operating state of each relaying device. FIG. 22 is a conceptual illustration for explaining transmission or reception of data performed by the transmission system. FIG. 23 is a sequential diagram illustrating preparatory operation before starting communication between transmission terminals. FIG. 24 is a sequential diagram that shows operation of narrowing down a number of relaying devices. FIG. 25 is a flowchart illustrating operation of narrowing down a number of relaying devices. FIG. 26 is a diagram illustrating operation of calculating a priority point used for selecting a relaying device. FIGS. 27A and 27B are a conceptual diagram illustrating operation of selecting a relaying device at a transmission terminal. FIG. 28 is a flowchart illustrating operation of selecting a relaying device at a transmission terminal. FIG. 29 is a sequential diagram illustrating operation of transmitting and receiving image data and audio data between transmission terminals. FIG. 30 is a flowchart illustrating operation of transmitting detection result data at a log management system. FIG. 31 is a flowchart illustrating operation of transmitting transmission approval data. FIG. 32 is a flowchart illustrating operation of transmitting or storing log data at a transmission terminal. FIG. 33 is a flowchart illustrating operation of transmitting log data to a transmission management device, performed by a transmission terminal.

First, example operation of managing the state data indicating an operating state of each relaying device will be illustrated with FIG. 21. The state detecting unit 32 of each relaying device 30 monitors an operating state of the relaying device 30 (step S1-1 to S1-4). The transmit/receive unit 31 of each relaying device 30 transmits each state data to the transmission management system 50 over the communication network 2. In this manner, the operating state of each relaying device 30 is managed in real time at the transmission management system 50 (step S2-1 to S2-4). Each state data includes the relaying device ID of the relaying device 30, and the operating state that is detected by the state detecting unit 32 of the relaying device 30 for each relaying device ID. In this embodiment, it is shown that the relaying devices (30a, 30b, 30d) are operating normally with the operation state of "on-line". On the other hand, the relaying device 30c has a failure on the program to carry out relaying operation of the relaying device 30c such that it has the operation state "off-line".

Subsequently, the transmit/receive unit 501 of the transmission management device 500 receives each state data, which is transmitted from the relaying device 30. The write/read processing unit 509 stores the state data for each relaying device ID in the relaying device management table (FIG. 9) of the storage unit 5000 (step S3-1 to S3-4). In this way, the operating state "on-line", "off-line", or "failure", for each relaying device ID is stored to the relaying device management table shown in FIG. 9. In this case, the receipt date at which the transmission management device 500 receives the state data, is also stored. When the state data is not transmitted from the relaying device 30, a filed of the operating state and the receipt date on each record of the relaying device management table shown in FIG. 9 may be left blank, or may include the operating state and the receipt date that are each received for the last time.

FIG. 2 illustrates transmission or receipt of the image data, the audio data, and various management data in the transmission system 1. A management data session sei is established between the requester terminal and the destination terminal to transmit various management data via the transmission management device 500 as shown in FIG. 22. In addition, four sessions are established between the requester terminal and the destination terminal to transmit each of four data, including the high resolution image data, the medium resolution image data, the low resolution image data, and the audio data via the relaying device 30. These four sessions are referred to as a call data session or a contents data session sed. The log data relating to the record of the process is included in the management data.

Next, preparatory operation that is performed prior to starting communication between the terminal 10aa and the terminal 10db will be illustrated with FIG. 23. Each management data is transmitted or received by the management data session sei in FIG. 23.

At first, when a user turns on the power switch 109 of the terminal 10 shown in FIG. 2, the operation input accepting unit 12 shown in FIG. 4 turns on the power according to the request for power-on (step S21). The login requesting unit 13 automatically transmits login request data indicating a request for login, to the transmission management device 500 over the communication network 2 by the transmit/receive unit 11, when the power-on request is processed (step S22). The login request data includes the terminal ID for identifying the terminal 10aa, and the password. The terminal ID and the password are read out from the storage unit 1000 by the write/read processing unit 19 to be transmitted to the transmit/receive unit 11. When the login request data is transmitted from the terminal 10aa to the transmission management device 500, the transmission management device 500 as a receiver may obtain the IP address of the terminal 10aa as a transmitter.

Subsequently, the terminal authenticating unit 502 of the transmission management device 500 authenticates the terminal by retrieving the terminal authentication management table (FIG. 10) in the storage unit 5000 using the terminal ID and the password, which are included in the login request data, as retrieval keys, to evaluate whether the same terminal ID and password are stored in the terminal authentication management table (step S23). When the terminal authenticating unit 502 evaluates that the terminal 10 requested for login is authorized, the state managing unit 503 stores the terminal ID of the terminal 10aa, the operating state, the receipt date at which the transmission management device 500 receives the login request data, and the terminal IP address (step S24). In this way, the terminal ID "01aa", the operating state "on-line", the receipt date "2009.11.10.13:40", and the terminal IP address "1.2.1.3" are managed in connection in the terminal management table shown in FIG. 11.

The transmit/receive unit 501 of the transmission management system 500 transmits authentication result data indicating the authentication result obtained by the terminal authenticating unit 502, to the requester terminal (terminal 10aa) that requested for login, over the communication network 2 (step S25). In this embodiment, it is assumed that the terminal authenticating unit 502 evaluated that the terminal 10 is an authorized terminal.

The terminal extracting unit 504 of the transmission management device 500 retrieves the address management table (FIG. 12) using the terminal ID "01aa" of the requester terminal (terminal 10aa), which requested login, as a retrieval key to extract terminal ID of the candidate destination terminal, to which the requester terminal (terminal 10aa) may request for videoconference (step S26). In this case, the terminal ID "01ab", "01ba", and "01db" of each destination terminal (10ab, 10ba, 10db), corresponding to the terminal ID "01aa" of the requester terminal 10aa, are extracted.

The terminal state obtaining unit 505 retrieves the terminal management table (FIG. 11) using the terminal IDs "01ab", "01ba", and "01db" of the candidate destination terminals, which are extracted by the terminal extracting unit 504, as retrieval keys to obtain the operating states of the terminals (10ab, 10ba, 10db). In this example, the operating states of the terminals 10ab, 10ba, and 10db are, respectively, the operating state "off-line", "on-line", and "on-line" (step S27).

The transmit/receive unit 501 transmits address state data, which includes the terminal ID ("01ab", "01ba", "01db") used as the retrieval key at step S27, and the operating state ("off-line", "on-line", "on-line") corresponding to the destination terminal (10ab, 10ba, 10db), to the requester terminal (terminal 10aa) over the communication network 2 (step S28). In this way, the requester terminal (terminal 10aa) is able to know the current operating state ("off-line", "on-line", "on-line") of the candidate destination terminal (10ab, 10ba, 10db) of the requester terminal (terminal 10aa).

The terminal extracting unit 504 of the transmission management device 500 retrieves the address list management table (FIG. 12) by the terminal ID "01aa" of the requester terminal (terminal 10aa), which requested login, as a retrieval key to extract the terminal ID of the other requester terminals, that registered the terminal ID "01aa" of the requester terminal (terminal 10aa) as a candidate destination terminal (step S29). In the address list management table of FIG. 12, the terminal ID of the extracted other terminals are "01ab", "01ba", and "01db".

The terminal state obtaining unit 505 of the transmission management device 500 retrieves the terminal state management table (FIG. 11) by the terminal ID "01aa" of the requester terminal (terminal 10aa), which requested login, as a retrieval key to obtain the operating state of the requester terminal (terminal 10aa) (step S30).

The transmit/receive unit 501 transmits address state data, which includes the terminal ID "01aa" of the requester terminal (terminal 10aa), which is obtained at step S30, and the operating state "on-line" to the terminals (10ba, 10db), whose operating state is "on-line" in the terminal management table, from among the terminals (10ab, 10ba, 10db) on the terminal ID ("01ab", "01ba", "01db") extracted at step S29 (FIG. 11) (step S31-1, S31-2). When the transmit/receive unit 501 transmits the address state data to the terminals (10ba, 10db), it refers to the IP address of the terminal, which is managed in the terminal management table shown in FIG. 12. In this way, the transmission management device 500 may transmit the terminal ID "01aa" of the requester terminal (terminal 10aa) and the operating state "on-line" to the other destination terminals (10db, 10ba) of the terminal 10aa.

On the other hand, at another terminal 10, when a user turns on the power switch 109, shown in FIG. 3, the operation input accepting unit 12, shown in FIG. 4, accepts the power-on, the above-described steps from S22 to S31-1, 2 are executed.

Next, operation of narrowing down a number of the relaying devices 30 will be illustrated with FIG. 24. The management data is transmitted or received through the management data session sei as illustrated in FIG. 24. In this embodiment, the requester terminal (terminal 10aa) may communicate with at least one of terminals (10ba, 10db), whose operating state is on-line based on the destination state data received at step S28, and selected from among the candidate destination terminals 10. IN this example, a case in which a user of the requester terminal (terminal 10aa) selects to start communication with the destination terminal (terminal 10db) will be illustrated.

When the user presses the operation button 108 shown in FIG. 2 to select the terminal 10db, the operation input accepting unit 12 shown in FIG. 4 accepts a request to start communication with terminal 10db (step S41). The transmit/receive unit 11 of the terminal 10aa transmits call start request data that requests scall start, which includes the terminal ID "01aa" of the requester terminal (terminal 10aa), and the terminal ID "01db" of the destination terminal (terminal 10db), to the communication management device 500 (step S42). In this way, the transmit/receive unit 501 of the transmission management device 500, which receives the call start request data, is able to obtain the IP address "1.2.1.3" of the requester terminal (terminal 10aa) as a transmitter. The state managing unit 503 updates the field of the operating state on record of the terminal ID "01aa" and "01db" in the terminal management table (FIG. 11) to "calling" respectively, based on the terminal ID "01aa" of the requester terminal (terminal 10aa) and the terminal ID of the destination terminal (terminal 10db), which are included in the call start request data (step S43). Although communication between the requester terminal (terminal 10aa) and the destination terminal (terminal 10db) is not started, the operating state becomes "calling" state. Therefore, when another terminal 10 tries to communicate with the requester terminal (terminal 10aa) or the destination terminal (terminal 10db), a voice or a sign that indicates "calling" state is outputted.

Next, operation of selecting the relaying device 30 will be illustrated with reference to step S44 to S48 and step S61 to S66. At first, the session ID generating unit generates a session ID, which identifies the call data session to be started between the requester terminal (terminal 10aa) and the destination terminal (terminal 10db) (step S44). The session managing unit 507 stores in connection with the session ID "se1", which is generated at step S44, the terminal ID "01aa" of the requester terminal (terminal 10aa), and the terminal ID "01db" of the destination terminal (terminal 10db) in the session management table (FIG. 13) of the storage unit 5000 (step S45).

The primary selection unit 506 of the transmission management device 500 narrows a number of the relaying device 30 to select a small number of relaying device 30 that are subjected for further selection process, using the relaying device management DB 5001, the terminal management DB 5003, and the priority management DB 5006 (step S46).

The operation at step S46 will be illustrated in detail with FIG. 25. The terminal IP address extracting unit 506b retrieves the terminal management table (FIG. 11) by the terminal ID "01aa" of the requester terminal (terminal 10aa) and the terminal ID "01db" of the destination terminal (terminal 10db), which are included in the call start request data transmitted from the requester terminal (terminal 10aa), to extract the IP address ("1.2.1.3", "1.3.2.4") of the corresponding terminal (10aa, 10db) (step S46-1). Then, the primary selecting unit 506c selects the relaying device ID (111a, 111b, 111d) of each one of the relaying devices (30a, 30b, 30d), whose operating state is "on-line", that are selected from among the relaying devices managed in the relaying device management table (FIG. 9) (step S46-2). In addition, the primary selecting unit 506c refers to the relaying device management table (FIG. 9) based on the IP address "1.2.1.3" of the requester terminal (terminal 10aa) and the IP address "1.3.2.4" of the destination terminal (terminal 10db), which are extracted at step S46-2. The primary selecting unit 506c evaluates whether the dot addresses of the IP address ("1.2.1.2", "1.2.2.2", "1.3.2.2") of the relaying device (30a, 30b, 30d) selected at step S46-2 are the same or not with respect to the IP address ("1.2.1.3", "1.3.2.4") of the requester terminal (terminal 10aa) and the destination terminal (terminal 10db), respectively, (step S46-3).

The priority determining unit 506d refers to the address priority management table (FIG. 14) to determine the address priority point for each relaying device (30a, 30b, 30d), which is evaluated at step S46-3. FIG. 26 shows a result of calculation obtained through the narrowing process. FIG. 26 is a conceptual diagram that shows the calculation of the priority points obtained through operation of narrowing down a number of the relaying devices 30. The address priority point, the transmission priority point, and a combination point are shown for each relaying device ID in FIG. 26. In addition, for each relaying device 30, a point to the requester terminal (terminal 10aa) and a point to the destination terminal (terminal 10db) are shown, respectively, for the address priority point and the speed priority point. The combination point is a sum of the higher point of the address priority point and the transmission rate priority point.

In this embodiment, the IP address "1.2.1.2" of the relaying device 30a is "same. same. same. different" in contrast with the IP address "1.2.1.3" of the requesting terminal (terminal 10aa). Therefore, the address priority point is "5" as shown in FIG. 26. The IP address "1.2.1.2" of the relaying device 30a is "same. different. different. different" in contrast with the IP address "1.3.2.4" of the destination terminal (terminal 10db). Therefore, the address priority point is "1". The IP address "1.2.2.2" of the relaying device 30b is "same. same. different. different" in contrast with the IP address "1.2.1.3" of the requesting terminal (terminal 10aa). Therefore, the address priority point is "3". The IP address "1.2.2.2" of the relaying device 30*b* is "same. different. same. different" in contrast with the IP address "1.3.2.4" of the destination terminal (terminal 10*db*). Therefore, the address priority point is "1". In addition, the IP address "1.3.2.2" of the relaying device 30*d* is "same. different. different. different" in contrast with the IP address "1.2.1.3" of the requesting terminal (terminal 10*aa*). Therefore, the address priority point is "1". The IP address "1.3.2.2" of the relaying device 30*d* is "same. same. same. different" in contrast with the IP address "1.3.2.4" of the destination terminal (terminal 10*db*). Therefore, the address priority point is "5".

Referring back to FIG. 25, the priority determining unit 506*d* retrieves the transmission rate priority table (FIG. 15) by the maximum data transmission rate of each relaying device 30, which is managed in the relaying device management table (FIG. 9), to determine the transmission rate priority point for each relaying device (30*a*, 30*b*, 30*d*), which is selected at step S46-2 (step S46-5). In this embodiment, the maximum data transmission rate of the relaying device 30*a* is 100 (Mbps) as shown in FIG. 9. Therefore, its transmission priority point is "3", obtained by referring to the transmission rate priority point shown in FIG. 15. In a substantially similar manner, the maximum data transmission rate of the relaying device 30*b* is 1000 (Mbps). Therefore, its transmission priority point is "5". Similarly, the maximum data transmission rate of the relaying device 30*d* is 10 (Mbps). Therefore, its transmission priority point is "1".

The primary selecting unit 506*c* selects two relaying devices 30 having the highest combination points, which is a sum of the higher one of the address priority points of the terminals (10*aa*, or 10*db*) and the transmission rate priority point (step S46-6). In this embodiment, the combination points of the relaying devices 30 having the relaying devices ID (111*a*, 111*b*, 111*d*) are "8", "8", "6", respectively. Therefore, the relaying device 30*a* having the relaying device ID "111*a*" and the relaying device 30*b* having the relaying device ID "111*b*" are selected.

When the narrowing process at step S46 is finished, the transmit/receive unit 501 shown in FIG. 4 transmits relaying device narrowing data to the destination terminal (terminal 10*db*) over the communication network 2 to transmit a number of the narrowed or selected relaying device 30 (step S47). The relaying device narrowing data includes a number of relaying devices 30 "2", which is narrowed at step S46, the terminal ID "01*aa*" of the requester terminal (terminal 10*aa*), and the session ID "se1". Therefore, the terminal 10*db* is able to know, not only what terminal 10 requested to start videoconference, but also the IP address "1.1.1.2" of the transmission management device 500 as a transmitter of the relaying device narrowing data.

The transmit/receive unit 11 of the terminal 10*db* transmits confirmation data indicating that the relaying device narrowing data is received, to the transmission management device 500 (step S48). The confirmation data includes the session ID "se1". Therefore, the transmission management device 500 is able to know, not only completion of transmitting the number of relaying devices, but also the IP address "1.3.2.4" of the destination terminal (terminal 10*db*) as a transmitter of the data.

Next, a process by which the destination terminal (terminal 10*db*) selects the relaying device 30 will be illustrated with FIG. 27A and FIG. 27B. The management data is transmitted or received through the management data session sei as illustrated in FIGS. 27A and 27B.

At first, the transmission management device 500 transmits preparatory relay request data indicating a request to relay preparatory data, to each relaying device (30*a*, 30*b*), which is selected at step S46, before the videoconference is started (step S61-1, 2). The preparatory relay request data includes the session ID "se1", the IP address "1.2.1.3" of the requester terminal (terminal 10*aa*), and the IP address "1.3.2.4" of the destination terminal (terminal 10*db*). Therefore, the relaying device (30*a*, 30*b*) is able to know, not only what session would be carried out by the requester terminal and the destination terminal, but also the IP address "1.1.1.2" of the transmission management device as a transmitter of the preparatory relay request.

The transmit/receive unit 31 of each relaying device (30*a*, 30*b*) transmits preparatory transmit request data indicating a request to transmit preparatory transmit data to the relaying device (30*a*, 30*b*), to the requester terminal (terminal 10*aa*), which is obtained at step S61-1, 2, over the communication network 2 (step S62-1, 2). The preparatory transmit data includes ping (Packet Internet Groper). The preparatory transmit request data includes the session ID "se1". Therefore, the requester terminal (terminal 10*aa*) is able to know, not only the preparatory transmit data is transmitted to each relaying device (30*a*, 30*b*) through the session having the session ID "se1", but also the IP address ("1.2.1.2", "1.2.2.2") of the relaying device (30*a*, 30*b*) as a transmitter of the preparatory transmit request data.

In the above-described example, the transmission management device 500 does not transmit the IP address of the destination terminal (terminal 10*db*) to the requester terminal (terminal 10*aa*) directly, but transmits the IP address of the destination terminal to the relaying device 30*a*, as described at step S61-1. The relaying device 30*a* requests to transmit the preparatory transmit data to the relaying device 30*a* as described at step S62-1. Hence, security is ensured, because the IP address of the terminal 10 is not transmitted to another terminal 10.

The transmit/receive unit 11 of the requester terminal (terminal 10*aa*) transmits the preparatory transmit data to the relaying device (30*a*, 30*b*) (step S63-1, 2). The preparatory transmit data is transmitted to the destination terminal (terminal 10*db*) via each relaying device (30*a*, 30*b*) in alternative to the image data and the audio data before the image data and the audio data is transmitted. The preparatory transmit data is used for measuring a lead time, from when the requester terminal (terminal 10*aa*) transmits the preparatory transmit data to when the destination terminal (terminal 10*db*) receives the preparatory transmit data. In addition, the preparatory transmit data includes ping to check that the requester terminal (terminal 10*aa*), the relaying device (30*a*, 30*b*), and the destination terminal (terminal 10*db*) are connected to allow communication; a transmission date at which the requester terminal (terminal 10*aa*) transmitted the preparatory transmit data; and the session ID "se1". Therefore, each relaying device (30*a*, 30*b*) is able to know, not only that the preparatory transmit data is received during the session having the session ID "se1", but also the IP address "1.2.1.3" of the requester terminal (terminal 10*aa*) as a transmitter of the preparatory transmit data.

Each relaying device (30*a*, 30*b*) relays the preparatory transmit data to the IP address "1.3.2.4" of the destination terminal (terminal 10*db*), which is included in the preparatory relay request data received at step S61-1, 2 (step S64-1, 2). Therefore, the destination terminal (terminal 10*db*) is able to know, not only that the preparatory transmit data is received during the session having the session ID "se1", but also the IP address ("1.2.1.2", "1.2.2.2") of the relaying device (30*a*, 30*b*) as a transmitter of the preparatory transmit data.

Then, the second selection unit 16 of the destination terminal (terminal 10*db*) selects one relaying device 30, which relays the image data and the audio data at the videoconference, based on the preparatory transmit data (step S65).

The process at step S65 will be illustrated in detail with FIG. 4 and FIG. 28. At first, the measuring unit 16a of the second selection unit 16, shown in FIG. 4, measures a receipt date of each preparatory transmit data, at which the transmit/receive unit 11 of the terminal 10db received the preparatory transmit data (step S65-1). Then, the calculating unit 16b calculates a lead time for each preparatory transmit data, whose receipt date is measured above, from when the preparatory transmit data is transmitted to when the preparatory transmit data is received, based on the difference between the receipt date and the transmission date, included in the preparatory transmit data (step S65-2). The second selecting unit 16c evaluates whether the preparatory transmit data for all "2" candidate relaying devices 30 were received during the session having session ID "se1" (step S65-3). When all preparatory transmit data were not received at 65-3, the second selecting unit 16c evaluates whether predetermined time (for instance, one minute) has passed since the terminal 10db received the preparatory transmit data. When the predetermined time has not passed at step S65-4, the operation goes back to step S65-1. When all preparatory transmit data were received at step S65-3, or the predetermined time has passed at step S65-4, the second selecting unit 16c selects one relaying device 30, which relayed the preparatory transmit data at the shortest lead time, calculated by the calculating unit 16b. In this embodiment, it is assumed that the lead time of the preparatory transmit data, relayed by the relaying device 30a, is shorter than that of the relaying device 30b. Accordingly, the relaying device 30a is selected as the second relaying device 30a to relay data.

In this embodiment described above, the relaying device 30a is selected at the destination terminal (terminal 10db). However, the destination terminal (terminal 10db) may transmit the lead time data indicating the lead time of the preparatory transmit data from the transmission to the receipt, to the requester terminal (terminal 10aa) or the transmission management device 500. The requester terminal (terminal 10aa) or the transmission management device 500 may narrow down to one relaying device 30a.

The transmit/receive unit 11 of the destination terminal (terminal 10db) transmits selection data, which shows selection of the relaying device 30a, to the transmission management device 500 over the communication network 2 (step S66). The selection data includes the session ID "se1", and the relaying device ID "111a" of the relaying device 30a selected above. Therefore, the transmission management device is able to know, not only selection of the relaying device 30a during the session having the session ID "se1", but also the IP address "1.3.2.4" of the terminal 10db as a transmitter of the selection data.

The session managing unit 507 of the transmission management device 500 stores the relaying device ID "111a" of the relaying device 30a, which is selected, in the field of the relaying device ID on the record of the session ID "se1" in the session management table (FIG. 13) of the session management DB 5005 (step S67). The transmit/receive unit 501 of the transmission management device 500 transmits relay start request data, which shows a request for relay start, to the relaying device 30a over the communication network 2 (step S68). The relay start request data includes the IP address ("1.2.1.3", "1.3.2.4") for each requester terminal (terminal 10aa) and each destination terminal (terminal 10db). Therefore, the relaying device 30a establishes the call data session between the terminal (10aa, and 10db) for communicating three kinds of image data, which include low resolution, medium resolution, and high resolution, and the audio data (step S69). In this way, the terminal (10aa, 10db) starts videoconference.

The destination terminal (terminal 10db) selects the relaying device at steps S48, S64-1, S64-2, and S65 after the transmission management device 500 has transmitted the relaying device narrowing data to the destination terminal (terminal 10db) at step S47. Alternatively, the transmission management device 500 may transmit the relaying device narrowing data to the requester terminal (terminal 10aa) at step S47. In this case, the data to be processed at step S64-1, 2 are transmitted to the requester terminal (terminal 10aa) in replace of the destination terminal (terminal 10db). Thus, the requester terminal (terminal 10aa) selects the relaying device to perform step S65, and transmits the selection data to perform step S66.

Next, a process of transmitting or receiving the contents data between the requester terminal (terminal 10aa) and the destination terminal (terminal 10db) to carry out videoconference is explained with reference to FIG. 4 and FIG. 29. It is to be noted that the process in which the contents data is transmitted from the terminal 10aa to the terminal 10db in one direction, and the process in which the contents data is transmitted from the terminal 10db to the terminal 10aa in another direction, are performed in a substantially similar manner as described below. The process includes transmission or receipt of the contents data, or detecting delay time. Therefore, only the process of transmitting from the terminal 10aa to the terminal 10db will be described for simplicity.

At first, the transmit/receive unit 11 of the requester terminal (terminal 10aa) transmits the image data of an object, which is imaged by the imaging unit 14a, and the audio data of a voice, which is inputted at the audio input unit 15a, to the relaying device 30a over the communication network 2 during the call data session sed (step S81). In this embodiment, the high quality image data, which is composed of the low resolution, the medium resolution, and the high resolution shown in FIG. 7, and the audio data are transmitted. The transmit/receive unit 31 of the relaying device 30a receives the image data of these three resolutions and the audio data. The data quality checking unit 33 retrieves the change quality management table (FIG. 8) by the IP address "1.3.2.4" of the destination terminal (terminal 10db) as a retrieval key to extract the corresponding image quality of the image data to be relayed, in order to check the image quality of the image data to be delayed (step S82). In this embodiment, the image quality of the image data is "high", which is the same with the image quality of the image data that the transmit/receive unit 31 received. Thus, the transmit/receive unit 31 forwards the high quality image data, as it is, and the audio data, as it is, to the destination terminal (terminal 10db) through the call data session (step S83). In this way, the transmit/receive unit 11 of the destination terminal (terminal 10db) receives the image data and the audio data. Thus, the image display control unit 14b causes the display 120 to display an image based on the image data, and the audio output unit 15b causes to output the audio based on the audio data.

The delay detecting unit 17 detects delay time (ms) of the image data. In this example, the delay time is received at the transmit/receive unit 11, regularly for a predetermined time period (for instance, once a second) (step S84). In this embodiment, it is assumed that the delay time is 200 (ms).

The transmit/receive unit 11 of the destination terminal (terminal 10db) transmits delay data indicating the delay time "200 (ms)", to the transmission management device 500 over the communication network 2 through the management data session sei (step S85). Thus, the transmission management device 500 is able to know, not only the delay time, but also the IP address "1.3.2.4" of the terminal 10db as a transmitter of the delay data.

The delay time managing unit 510 of the transmission management device 500 retrieves the terminal management table (FIG. 11) by the IP address "1.3.2.4" of the destination terminal (terminal 10db), as a retrieval key, to extract corresponding terminal ID "01db". In addition, the delay time managing unit 510 stores the delay time "200 (ms)", which is the delay data, in the field of the delay time on the record of the terminal ID "01db" in the session management table (FIG. 13) (step S86).

The quality determining unit 508 searches the quality management table (FIG. 16) using the delay time "200 (ms)" as a retrieval key to extract corresponding image quality "medium" of the image data (step S87), and determines that the image quality of the image data is "medium".

The transmit/receive unit 501 retrieves the session management table (FIG. 13) using the relaying device ID "111a" as a retrieval key, to extract corresponding IP address "1.2.1.2" of the relaying device 30a (step S88). The transmit/receive unit 501 transmits quality data indicating the image quality "medium" of the image data, which is determined at step S87, to the relaying device 30a over the communication network 2 through the management data session sei (step S89). The quality data includes the IP address "1.3.2.4" of the destination terminal (terminal 10db), which is used as a retrieval key at step S86. Then, the change quality managing unit 34 of the relaying device 30a stores the IP address "1.3.2.4" of the terminal 10 as a relay address (destination terminal (terminal 10db)), in connection with image quality "medium" of the image data in the change quality management table (FIG. 8) (step S90).

The terminal 10aa transmits the image data, including low image quality, medium image quality, and high image quality, and the audio data, to the relaying device 30a over the communication network 2 through the call data session sed in a substantially similar manner as described above at step S81 (step S91). The data quality checking unit 33 retrieves the change quality management table (FIG. 8) using the IP address "1.3.2.4" of the destination terminal (terminal 10db) as a retrieval key to extract a corresponding image quality "medium" of the image data to be relayed, to check the image quality of the image data (step S92). In this embodiment, the image quality of the image data is "medium", which is lower than the image quality of the image data that the transmit/receive unit 31 received. Accordingly, the data quality changing unit 35 changes the image quality of the image data from "high" to "medium" (step S93). Then, the transmit/receive unit 31 transmits the image data, whose image quality is changed to "medium", and the audio data, as it is, to the destination terminal (terminal 10db) over the communication network 2 through the call data session (step S94). In this way, when a delay occurs in receiving the data at the destination terminal (terminal 10db), the relaying device 30a changes the quality of the image data. This would suppress a user or a participant of videoconference from feeling discomfort.

Referring to FIG. 30, operation of detecting a predetermined event and transmitting detection result data that is generated based on the detection result, performed by the log management device 550a, is explained according to an example embodiment of the present invention. The operation of FIG. 30 is started after the transmission management device 500 accepted the request for login and authenticated the terminal 10aa (step S23 in FIG. 23). In such case, the terminal 10 transmits data that requests the log management device 550a to detect the predetermined event. More specifically, in this example, the log management device 550 starts detecting a predetermined event after accepting login of the terminal 10. Alternatively, the log management device 550 may consistently detect the predetermined event.

In this example, the predetermined event includes any event that may prevent the log management device 500 to manage new log data using the log management table. Examples of predetermined event include, but not limited to, an event indicating that the log management device 550a is in error or failure ("error"), an event indicating that the log management device 550a is in the state that is not temporarily unavailable ("busy"), an event indicating that the log management table is in the process of being upgraded or backed up ("maintenance"), and an error indicating that the network connected to the log management device 550a is in failure ("network error").

In operation, referring to FIG. 30, the event detecting unit 552 sets a default value of the detection result data (step S101) to one of the events that may be generated at the log management device 550a. For example, the event detecting unit 552 sets the detection result data to the "error" event by default. The write/read processing unit 559 stores the detection result data having the default value at a predetermined storage area of the storage unit 5500.

The event detecting unit 552 determines whether the log management device 550a has generated an event that matches the predetermined event (step S102). When the log management device 550a has generated an event that matches the predetermined event at step S102, that is, when the predetermined event is detected, the event detecting unit 552 produces the detection result data based on the detection result (step S103). For instance, when the "busy" event is detected at the log management device 550, the event detecting unit 552 produces the detection result data "busy". On the other hand, when the log management device 550a has not generated any event that matches the predetermined event at step S102, the event detecting unit 552 produces the detection result data "none" (step S104).

The event detecting unit 552 determines whether the detection result data produced at S103 is different from the default detection result data stored at the predetermined storage area (step S105). When these detection result data are different ("YES" at S105), the write/read processing unit 559 updates the default detection result data stored in the predetermined storage area (step S106) with the detection result data that is currently detected. For instance, if the default detection result data, stored in the predetermined storage area, is "error", and the produced detection result data is "busy"; the write/read processing unit 559 updates the detection result data "error" to the detection result data "busy". The transmit/receive unit 551 transmits the detection result data and the log management device ID "A" of the log management device 550a to the transmission approval data management device 570 (step S108). In this manner, the detection result data is transmitted to the transmission approval data management device 570, as soon as the detection result data is updated. In this example, the IP address "1.1.1.7" of the transmission approval data management device 570 may be previously stored in a predetermined storage area of the storage unit 5500. Thus, the detection result data may be transmitted using the IP address of the transmission approval data management device 570. It is to be noted that although in this embodiment the transmit/receive unit 551 transmits the detection result data to the transmission approval data management device 570, the transmit/receive unit 551 may alternatively transmit the detection result data to the terminal 10aa directly.

When these detection result data are the same at step S105 ("NO" at S105), the transmit/receive unit 551 determines whether the predetermined time period has passed from the time when the previous detection result data that is previously detected is transmitted (step S107). When it is determined that the predetermined time period has not passed at step S107 ("NO" at S107), the operation returns to S102 to cause the event detecting unit 552 to detect a predetermined event (step S102). In this manner, a number of events that can be detected at the event detecting unit 552 increases at least within the predetermined time period, when it is determined that the detection result data has not been changed from the time when the previous detection result data is transmitted. When it is determined that the predetermined time period has passed ("YES" at S107), the transmit/receive unit 551 transmits the detection result data and the log management device ID "A" of the log management device 550a to the transmission approval data management device 570 (step S108).

When the detection result data is transmitted at step S108, the operation returns to S102 to cause the event detecting unit 552 to detect a predetermined event (step S102) to repeat the above-described steps.

Referring now to FIG. 31, operation of generating transmission approval data and transmitting the transmission approval data to the terminal 10, performed by the transmission approval data management device 570, is explained according to an example embodiment of the present invention.

At S111, the transmit/receive unit 571 of the transmission approval data management device 570 determines whether the detection result data is received from the log management device 550a. When the transmit/receive unit 571 of the transmission approval data management device 570 receives the detection result data from the log management device 550a ("YES" at S111), the determining unit 572 determines, under what condition, the terminal 10 should transmit the log data to the log management device 550 (step S112) based on the received detection result data. More specifically, in this example, the determining unit 572 obtains, for each log type data, the transmission approval data that is stored with respect to the received detection result data from the detection result data management table (FIG. 18). Referring to FIG. 18, when the received detection result data is "busy", the determining unit 572 obtains the transmission approval data "approval" for the log type "priority", and the transmission approval data "disapproval" for the log type "general".

At S111, when the transmit/receive unit 571 determines that the detection result data is not received from the log management device 550a ("NO" at S111), the operation proceeds to S113 to determine whether a predetermine time period has passed from the time at which the previous detection result data is received. When it is determined that the predetermined time period has passed from the time at which the previous detection result data is received ("YES" at S113), the operation proceeds to S114.

At S114, the determining unit 572 generates the transmission approval data corresponding to the log management device 550 having the log management device ID "A" to be "disapproval". In this example, the predetermined time period may be set to any desired value that is longer than the time period set at S107 of FIG. 30 as a time period in which the log management device 550a transmits the detection result data. In this manner, when the transmit/receive unit 571 has not received the detection result data for the predetermined time period that is set longer than the time period at which the log management device 550a transmits the detection result data ("YES" at S113), it is determined that the log management device 550a is causing an error. Accordingly, the determining unit 572 determines that the transmission approval data to be disapproval at S114, causing the terminal 10 to not to send the log data to the log management device 550a.

The comparing unit 573 compares the transmission approval data that is currently determined by the determining unit 572 with the transmission approval data that is stored in the device management table (FIG. 19) to determine whether these results are different from each other (step S115). When these results are the same ("NO" at S115), the operation returns to S111 to cause the transmission approval data management device 570 to wait for new detection result data (step S111). When these results are different ("YES" at S115), the write/read processing unit 579 updates the transmission approval data of the log management device 550a having the management device ID "A" with the currently determined transmission approval data (step S116). The transmit/receive unit 571 obtains the terminal IP address that is stored with respect to the log management device ID "A", from the destination terminal management table of FIG. 20 (step S117). The transmit/receive unit 571 transmits the transmission approval data of each log type data, and the log management device ID "A", using the obtained IP address (step S118). When the transmission approval data is transmitted, the operation returns to S111 to cause the transmit/receive unit 571 to perform operation of determining whether the detection result data is received from the log management device 550a (step S111).

Referring now to FIG. 32, operation of generating and processing predetermined log data relating to a call data session sed that is established between the terminal 10aa and another terminal, performed by the terminal 10aa, will be illustrated. In this example, the predetermined log data relating to the call data session sed is any log data that is generated in relation to a predetermined process performed during the call data session sed. Examples of the predetermined log data include, but not limited to, the log data relating to a request for starting the call data session sed (FIG. 24, step S42), a request for ending the session, a request for permission to start, a request for permission to end, interruption in transmitting the image data, or interruption in transmitting the audio data. For the descriptive purposes, in this example, it is assumed that the log data is produced based on a request for a process relating to the call data session that is accepted by the operation input accepting unit 12. In alternative to or in addition to the log data relating to the call data session accepted by the operation input accepting unit 12, the log producing unit 18 may produce any other desired log data, such as the log data based on a process for transmitting the preparatory transmit request data (FIG. 27A, step S63-1), which is not accepted by the operation input accepting unit 12.

When the operation input accepting unit 12 of the terminal 10aa accepts a request for a process relating to the call data session sed, the log producing unit 18 produces the log data based on the contents of the process (step S121). In this case, the operation input accepting unit 12 produces the log data "invite" indicating the process relating to the start of the call data session, "bye" indicating the process relating to the end of the call data session, "cancel" indicating the process relating to the cancellation of the request, or "mute" indicating the process relating to interruption in transmitting the audio data. The write/read processing unit 19 extracts the log type data corresponding to the produced log data from the predetermined storage area of the terminal 10 (step S122). In this embodiment, when the produced log data is related to the interruption for transmitting the audio data or the image data, the log type data "priority" is extracted. Otherwise, the log type data "general" is extracted.

The selecting unit 20 refers to the storage management table (FIG. 5) to determine whether the extracted log type data of the highest priority (the priority data "1") log management device has the transmission approval data "approval" (step S123). When the transmission approval data is "approval" at step S123 ("YES" at S123), the transmit/receive unit 11 transmits the produced log data to the log management device (step S124). When the transmission approval data is not "approval" at step S123 ("NO" at S123), the selecting unit 20 determines whether there is the next highest priority log management device in the storage management table (step S125). When there is the next highest priority log management device ("YES" at S125), the selecting unit 20 determines whether the extracted log type data of the next highest log management device has the transmission approval data "approval" at step S123. When there is no next highest priority log management device ("NO" at S125), the write/read processing unit 19 stores the produced log data and information indicating the current date and time to the temporary log management table (FIG. 6) (step S126).

As described above, even when the terminal 10aa is not able to transmit the log data to the highest priority log management device 550, the terminal 10aa is able to transmit the log data to the next highest priority log management device 550 without causing delay in transmission. Further, in this example, a priority in sending the log data relating to interruption in transmitting the audio data or the image data is set higher than other type of data. In such case, the log management device 550, which receives the high priority log data, may send notification indicating the contents of the high priority log data to a counterpart terminal 10 through the management device 500. In this manner, when the transmission of the audio data or the image data is interrupted at the terminal 10aa, the counterpart terminal 10 is able to receive the log data indicating that transmission of data is interrupted, from the transmission management device 500. Further, when the terminal 10 cannot transmit even the high priority log data to the log management device 550, the image display control 14b of the terminal 10aa may display notification indicating the contents of the high priority log data through the display 120. For instance, when the terminal 10aa cannot transmit the log data indicating interruption in transmitting the audio data to the log management device 550, the terminal 10aa may display notification through the display 120. In this manner, the user at the counterpart terminal 10 is able to see the notification being displayed on the display 120 as such information is transmitted through the call data session.

Referring now to FIG. 33, operation of transmitting the log data stored in the temporary log management table to the log management device 550, performed by the terminal 10aa, is explained according to an example embodiment of the present invention. The transmit/receive unit 11 of the terminal 10aa receives the transmission approval data and the log management device ID "A", which are transmitted from the transmission approval data management device 570 at step S117 in FIG. 31 (step S131). The write/read processing unit 19 of the terminal 10aa updates the transmission approval data in the storage management table (FIG. 5) based on the received transmission approval data and the log management device ID "A" (step S132).

The transmit/receive unit 11 determines whether the log data is stored in the temporary log management table (FIG. 6) or not (step S133). When the log data is not stored in the temporary log management table ("NO" at S133), the operation ends as there is not need to transmit the log data to the log management device 550. When the log data is stored in the temporary log management table ("YES" at S133), the write/read processing unit 19 refers to the temporary log management table (FIG. 5) to determine whether the transmission approval data that corresponds to the log management device ID "A" is "approval" (step S134) for the log type data of the stored log data.

When the transmission approval data is not "approval" at step S134 ("NO" at S134), the operation ends without transmitting the log data as the log management device 550a does not manage the stored log data. When the transmission approval data is "approval" at step S134 ("YES" at S134), the transmit/receive unit 11 transmits the log data, which is stored in the temporary log management table (FIG. 6), to the log management device 550a (step S135), and the operation ends.

As described above, the log management system 55 detects a predetermined event generated at the log management device 550, and determines whether the terminal 10 should transmit log data to the log management system 55 based on the detection result. When this determination is changed, the log management system 55 transmits the transmission approval data indicating whether to transmit the log data, to the terminal 10. In this manner, when the log management device 550 is not available, the terminal 10 is caused not to send log data but locally store the log data at least temporarily according to the transmission approval data. Further, when the log management device 550 is available, the terminal 10 is caused to transmit log data, which is managed temporarily, to the log management device 55 based on the received transmission approval data. Further, in this example, the transmission approval data management device 570 transmits the transmission approval data indicating whether to transmit the log data, to the terminal 10, when the determination result is changed based on the detection result indicating the predetermined event at the log management device 550.

Since the log data is managed at least locally at the terminal 10 when the log management device 550 is not available, and the temporarily managed log data is sent to the log management device 550 when the log management device 550 becomes available, the log data is managed more efficiently. The above-describe example further reduces the work load on the log management system 55 or the terminal 10, when compared to the case in which the log management device 550 transmits the operating state at the log management device 550 in response to an inquiry received from each terminal 10.

Further, in this example, the transmission approval data management device 570 manages the detection result data indicating the detection result of the log management device 550, in association with the transmission approval data. The determining unit 572 of the transmission approval data management device 570 determines whether the terminal 10 should transmit the log data to the log management device 550, by obtaining the transmission approval data corresponding to the detection result data from the detection result data management table. With this correspondence information, the transmission approval data management device 570 is able to easily manage whether the terminal 10 should transmit the log data to the log management device 550 based on the detection result received from the log management device 550.

Further, in this example, the transmission approval data management device 570 manages the detection result data in association with the log type data indicating a type of the log data. With this correspondence information, the transmission approval data management device 570 is able to easily manage whether the terminal 10 should transmit the log data to the log management device 550 based on the type of the log data to be transmitted.

Further, in this example, the log management device 550 receives the log data relating to the call data session "sed", through a session that is different from the call data session "sed". Therefore, even when the session between the terminal 10 and the log management device 550 is interrupted, the terminal 10 may continue the call data session "sed". Further, when the terminal 10 receives the transmission approval data indicating that the log data is to be transmitted to the log management device 550 now available from the transmission approval data management device 570, the terminal 10 is able to instantly transmit the log data relating to the call data session "sed" to the log management device 550.

Further, in this example, the transmission approval data management device 570 classifies log type data into first log type data and second log type data, and manages these types of log type data with respect to the transmission approval data. More specifically, in this example, the first log type data is any log data relating to interruption in transmitting the image data or the audio data, and the second log type data is any other data. The transmission approval data management device 570 manages the first log type data with respect to the transmission approval data indicating that the log data is to be transmitted, and the second log type data with respect to the transmission approval data is not to be transmitted. With this corresponding information, the terminal 10 transmits the log data that is classified into the first log type data relating to interruption in transmission of the image data or the audio data, to the log management device 550, in high priority. In this case, the log management device 550 receiving the log data, transmits the contents of the log data to the counterpart terminal 10 through the transmission management device 500. In this manner, the counterpart terminal 10 receives the log data indicating interruption in data transmission from the transmission management device 500.

Further, in this example, the log management device 550 detects the predetermined event of the log management device 550 by itself, and transmits the detection result data that is produced based on the detection result at a predetermined time, such as once per a predetermined time period. The transmission approval data management device 570 is able to produce the transmission approval data, either based on the detection result data that is transmitted from the log management device, or based on determination indicating that the detection result data is not received for a predetermined time period.

Further, in this example, the transmission approval data management device 570 manages the log management device ID for identifying the log management device 550, in association with the transmission approval data of the log management device 550. Further, the transmission approval data management device 570 manages the log management device ID of the log management device 550 in association with the terminal ID for identifying the terminal as a destination to which the transmission approval data of the log management device 550 is to be sent. With this correspondence information, the transmission approval data management device 570 may easily manage the transmission approval data of two or more log management devices 550. Even when any log management device 550 becomes unavailable, log data may be managed using another log management device 550 that is available.

Further, in this example, the terminal 10 temporarily manages the log data, when it receives the transmission approval data indicating not to transmit the log data to the log management system 55. In addition, the terminal 10 transmits the log data that is temporarily managed, to the log management device, when the terminal 10 receives the transmission approval data indicating to transmit the log data to the log management system 55. This prevents delay in transmitting the log data.

Further in this example, the terminal 10 manages the log management device ID for identifying the log management device as a destination to which the log data is transmitted, in association with the priority data indicating a priority in selecting the destination log management device from among two or more log management devices. With this correspondence information, the terminal 10 is able to easily select the destination log management device from among two or more log management devices, based on the transmission approval data and the priority data.

As described above, the transmission system 1 of FIG. 1 is able to reduce a number of relaying devices 30 that are candidate for relaying the image data or the audio data, by using information available from environment. For example, even when the transmission system 1 is able to obtain information relating to the environment on which the LAN 2 is provided such as the relaying device 30 IP address, the transmission system 1 may not able to obtain information relating to the environment on which the entire communication network 2 such as the Internet 2i is provided. In view of this, using the available information, the transmission system 1 selects one relaying device that relays the preparatory transmit data at the fastest rate, by transmitting the preparatory transmit data through candidate relaying devices 30 before transmitting the image data and the audio data between the terminals 10.

More specifically, the transmission system 1 selects two or more relaying devices 30 whose IP address are close to that of either one of request terminal 10 and destination terminal 10. The relaying device 30 that transmits the preparatory transmit data at the fastest rate is selected from among two or more candidate relaying devices 30, by transmitting the preparatory transmit data between the requester terminal and the destination terminal via each candidate relaying device. Through the selected relaying device 30, the transmission system 1 is able to transmit or receive the high quality image data or audio data under current environment of the communication network 2.

In the embodiment described above, the management system 50 does not only select the relaying device 30 having the IP address that is close to that of the terminal 10 requesting a videoconference, but also the relaying device 30 having the maximum data transmission rate. In this manner, the relaying device 30 is selected while taking into account the actual environment of the communication network 2.

The relaying device 30 is selected from among the relaying devices 30 having the on-line operating states. Therefore, it is possible to narrow down to one relaying device 30 in a manner that reflects the actual environment of the communication network 2.

The transmission management system 50, or the program providing system 90, may be implemented by a single computer, or two or more computers, to perform the above-described functions or operations. When a single computer constructs the program providing system 90, a program, which is transmitted by the program providing system, may be divided into two or more modules for transmission, or may be transmitted without being divided. When two or more computers construct the program providing system 90, the program may be divided into two or more modules for transmission.

A recording medium storing any one of the terminal program, relaying device program, transmission management device program, or a storage device such as the HD 204 that stores any one of the terminal program, relaying device program, and transmission management device program, or the program providing system 90 provided with the HD 204 storing any one of the terminal program, relaying device program, and transmission management device program, may be distributed within the country or to another country as a computer program product.

In the above-described examples, any one of the tables of FIG. 9, FIG. 11, and FIG. 13 manages the stored information in terms of the date and time at which the information is received. Alternatively, any other information may be used to manage information, for example, based on the time at which the information is received.

In this embodiment, the relaying device IP address is managed using the table of FIG. 9, and the terminal IP address is managed using the table of FIG. 11, respectively. Alternatively, these tables may manage identification information in terms of FQDN (Fully Qualified Domain Name), if it is the relaying device identification data that identifies the relaying device 30 on the communication network 2, or the terminal identification data that identifies the terminal 10 on the communication network 2. In such case, the IP address corresponding to the FQDN is obtained at a common DNS (Domain Name System) server. Further, the relaying device identification data, which identifies the relaying device 30 on the communication network 2, may be represented as "relaying device access point data, which shows an access point of the relaying device 30 on the communication network 2", or "relaying device address data, which shows an address to the relaying device 30 on the communication network 2". Similarly, "the terminal identification data, which identifies the terminal 10 on the communication network 2" may be represented as "terminal access point data, which shows an access point of the terminal 10 on the communication network 2", or "terminal address data, which shows an address to the terminal 10 on the communication network 2"

In this example, the transmission system 1 is implemented as a videoconference system. Alternatively, the transmission system 1 may be implemented as a phone system such as an IP (Internet protocol) phone or a facsimile, or an Internet phone or a facsimile. Further, the transmission system 1 may be a car navigation system. In such case, one terminal 10 corresponds to a car navigation device that may be installed onto a car, and another terminal 10 corresponds to a management terminal provided at a management center for managing car navigation or a car navigation device that may be installed on another car. Further, the transmission system 1 may be an image forming system. In such case, the terminal 10 corresponds to an image forming device.

Further, in the above-described example, the log management table is produced for each terminal ID for identifying the terminal 10. Alternatively, the log management table may manage the log data of two or more terminals, by storing the terminal ID for identifying the terminal 10, the log ID for identifying the log data, the log data, the session ID, and the date management data in association with one another.

Further, in the above-described embodiment, the image data and the audio data are treated as an example of the contents data. Alternatively, the contents data may include touch data. In such case, a sense of touch, which is generated by a user at one terminal, is transmitted to another terminal. In addition, the contents data may include smell data. In such case, a sense of smell at one terminal is transmitted to another terminal. In addition, the contents data may be at least one of the image data, the audio data, the touch data, and the smell data.

Further, the above-described example embodiments each illustrate the case in which the videoconference is carried out by the transmission system 1. Alternatively, the transmission system 1 may be applied to perform any other type of meeting, conversation within a family or friends, or to provide data in one direction from one device to another device.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In one example, any one of the functions or operations performed by the transmission terminal 10, the log management device 550, and the transmission approval data management device 570 may be performed in various other ways. For example, in alternative to cause the log management device 550 to generate detection result data, the transmission approval data management device 570 may generate detection result data based on a detection result indicating whether any predetermined event is detected at the log management device 550. Further, the transmission approval data management device 570 may additionally manage priority data indicating the degree of priority in selecting a log management device to which the log data is to be transmitted (FIG. 5), for each one of the plurality of transmission terminals 10. In such case, the transmission approval data management device 570 may transmit the priority data, or information regarding a destination to which the log data is to be transmitted, together with the transmission approval data to the transmission terminal 10 to cause the transmission terminal 10 to store such information in the storage management table of FIG. 5. In a substantially similar manner, when the transmission approval data management device 570 determines that the log management device 550 is not available as the predetermined event is detected, the transmission approval data management device 570 may send an instruction to the transmission terminal 10 to send at least the high priority log data to the counterpart terminal 10 or any other device that is communicable such as the management system 500.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: a log management system that receives and manages log data from a transmission terminal that produces the log data, including: event detecting means for detecting a predetermined event of the log management system; determining means for determining whether the transmission terminal transmits the log data to the log management system based on a detection result of the event detecting means; transmission approval data management means for managing transmission approval data indicating a determination result of the determining means; comparing means for comparing the determination result currently determined by the determining means with a determination result indicated by the transmission approval data managed by the transmission approval data management means; and transmission approval data transmitting means for transmitting the transmission approval data indicating the determined result determined by the determining means, to the transmission terminal, when the determination result determined by the determining means is different from the determination result indicated by the transmission approval data managed by the transmission approval management means.

In another example, the log management system further includes: a detection result data management means that manages detection result data indicating the detection result of the event detecting means, in association with the transmission approval data. The determining means obtains the transmission approval data that corresponds to the detection result data, from the detection result data management means.

In another example, in the log management system, the detection result data management means manages the detection result data in association with the log type data indicating a type of the log data, and the transmission approval data. The determining means obtains the transmission approval data that corresponds to the detection result data, for each log type data, from the detection result data management means.

In another example, in the log management system, the transmission terminal transmits data to another transmission terminal. The log data relates to a session through which call data including image data or audio data is transmitted between the transmission terminals. The log management system receives the log data from the transmission terminal through a session, which is different from the session through which the call data is transmitted.

In another example, the call data includes contents data. The detection result data management means manages predetermined detection result data in association with first log type data to which the log data relating to interruption in transmitting the contents data belongs, and transmission approval data indicating that the first log type data is to be transmitted by the transmission terminal, and predetermined detection result data in association with second log type data to which the log data other than the log data of the first log type data belongs, and transmission approval data indicating that the second log type data is not to be transmitted by the transmission terminal.

In another example, the log management system further includes: a log management device and a transmission approval data management device. The log management device includes the event detecting means for detecting the predetermined event of the log management system; and a detection result data transmitting means for transmitting the detection result data indicating the detection result of the event detecting means, at each predetermined time. The transmission approval data management device includes: detection result data receiving means for receiving the detection result data; the determining means for determining whether the transmission terminal is to transmit the log data to the log management device, based on either the detection result data or an elapsed time period counted from the time at which the transmission approval data management device receives the previous detection result data; the transmission approval data management means; and the transmission approval data transmitting means.

In another example, the log management system includes a plurality of the log management devices. The transmission approval data management device includes device management means for managing a log management device identification for identifying the log management device, in association with the transmission approval data; and destination terminal management means for managing the log management device identification in association with an destination terminal identification for identifying the transmission terminal as a destination to which the transmission approval data is transmitted.

In another example, the present invention may reside in a transmission system including: any one of the above-described log management system, and a transmission terminal. The transmission terminal includes: transmission approval data receiving means for receiving the transmission approval data; temporary log management means for temporarily managing the log data when the transmission terminal does not transmit the log data to the log management system based on the transmission approval data; and log data transmitting means for transmitting the temporarily managed log data using the temporary log management means to the log management system based on the transmission approval data.

The transmission system further includes priority management means for managing a destination device identification for identifying the log management device as a destination to which the log data is to be transmitted, in association with priority data indicating the degree of priority, when the log management device as the destination of the log data is selected from a plurality of the log management devices; and a selecting unit that selects the log management device as the address of the log data based on the transmission approval data and the priority data.

In another example, the present invention may reside in a log management method implemented by a log management system that receives and manages log data from the transmission terminal that produces the log data, the method including the steps of: detecting the predetermined event of the log management system; determining whether the transmission terminal transmits the log data to the log management system based on the detection result of the event detecting step; managing transmission approval data indicating the result determined by the determining step; and comparing the determination result determined by the determining step with a determination result indicated by the transmission approval data managed in the transmission approval data management step, and transmitting the transmission approval data indicating the determined result determined by the determining, to the transmission terminal, when the determined result by the determining step is different from the determination result indicated by the transmission approval data managed in the transmission approval management step.

In another example, the present invention may reside in a log management program product including a computer usable medium having computer-readable codes embodied in the medium for causing a computer to operate as each means of the log management system described above.

In another example, the present invention may reside in a log management system including a log management device to receive log data generated by a transmission terminal a and store the log data in a memory; and a data management apparatus to manage transmission of the log data generated by the transmission terminal from the transmission terminal to the log management device. The log management device detects whether a predetermined event is generated at the log management device at a predetermined time, and generates detection result data indicating whether the predetermined event is generated at the predetermined time. The data management apparatus receives the detection result data from the log management device, determines whether the log data is to be transmitted from the transmission terminal to the log management device based on the detection result data to generate a determination result; store, in a memory, transmission approval data having the determination result generated based on the detection result data received from the log management device, and transmits the transmission approval data having the determination result to the transmission terminal to cause the transmission terminal to process the log data according to the determination result of the transmission approval data.

In another example, the present invention may reside in a recording medium storing a plurality of instructions which, when executed by a processor, cause the processor to perform a method of managing transmission of log data generated by a transmission terminal from the transmission terminal to a log management device, the method including: receiving detection result data indicating whether a predetermined event is detected at the log management device; determining whether the log data is to be transmitted from the transmission terminal to the log management device based on the detection result data to generate a determination result; storing, in a memory, transmission approval data having the determination result generated based on the detection result data received by the receive unit; and transmitting the transmission approval data having the determination result to the transmission terminal to cause the transmission terminal to process the log data according to the determination result of the transmission approval data.

The invention claimed is:

1. A data management apparatus to manage transmission of log data generated by a transmission terminal from the transmission terminal to a log management device, the apparatus comprising:
    a receiver to receive detection result data indicating whether a predetermined event is detected at the log management device;
    processing circuitry configured to determine whether the log data is to be transmitted from the transmission terminal to the log management device based on the detection result data to generate a determination result;
    a memory to store transmission approval data having the determination result generated based on the detection result data received by the receiver; and
    a transmitter to transmit the transmission approval data having the determination result to the transmission terminal to cause the transmission terminal to transmit the log data according to the determination result of the transmission approval data,
    the processing circuitry being further configured to compare the determination result of the transmission approval data stored in the memory with a new determination result of the transmission approval data that is generated based on new detection result data received by the receiver to generate a comparison result, and only when the comparison result indicates that the determination result and the new determination result are different from each other, the transmitter transmits the transmission approval data having the new determination result to the transmission terminal to cause the transmission terminal to transmit the log data according to the new determination result of the transmission approval data,
    the processing circuitry being further configured to determine whether the log data is to be transmitted from the transmission terminal to the log management device based on log type data indicating a type of log data subjected for transmission in addition to the detection result data to generate the determination result indicating whether the log data is to be transmitted from the transmission terminal to the log management device for each type of log data, and to generate the transmission approval data for each type of log data having the determination result,
    wherein the log data generated by the transmission terminal is classified into first log type data that is generated in relation to interruption in data transmission, and second log type data other than the first log type data, and
    the processing circuitry is further configured to generate first transmission approval data having a determination result indicating that the first log type data is to be transmitted from the transmission terminal to the log management device based on the detection result data, and second transmission approval data having a determination result indicating that the second log type data is not to be transmitted from the transmission terminal to the log management device based on the detection result data.

2. The data management apparatus of claim 1, wherein:
    when the receiver does not receive detection result data for a predetermined time period, the processing circuitry is configured to generate a determination result indicating that the log data is not to be transmitted from the transmission terminal to the log management device.

3. The data management apparatus of claim 1, wherein:
    the memory is further configured to store the transmission approval data having the determination result generated for each type of log data, in association with the log type data.

4. The data management apparatus of claim 3, wherein the log management device includes a plurality of log management devices, and
    the memory is further configured to store device identification information for identifying one of the plurality of log management devices in association with the transmission approval data.

5. The data management apparatus of claim 4, wherein:
    the memory is further configured to store destination terminal identification information for identifying at least one destination transmission terminal to which the transmission approval data is transmitted from the data management apparatus.

6. The data management apparatus of claim 4,
    the processing circuitry being further configured
    to store priority data indicating a degree of priority in selecting each one of the plurality of log management devices in association with device identification information for identifying each one of the plurality of log management devices; and
    select one of the plurality of log management devices as a destination to which the log data is to be transmitted based on the transmission approval data and the priority data, wherein
    the transmitter is further configured to send information indicating the selected one of the plurality of log management devices to the transmission terminal.

7. The data management apparatus of claim 6, wherein:
the transmitter is further configured to send notification to the transmission terminal to cause the transmission terminal to send at least contents of the log data to a counterpart transmission terminal through a session to transmit call data to the counterpart transmission terminal, in addition to transmitting the transmission approval data having a determination result indicating that the log data is not to be transmitted to the log management device.

8. A transmission system, comprising:
a transmission terminal to generate log data;
a log management device to store the log data, which is received from the transmission terminal, in a first memory; and
a data management apparatus to manage transmission of the log data generated by the transmission terminal from the transmission terminal to the log management device, wherein:
the log management device is configured to:
  detect whether a predetermined event is generated at the log management device at a predetermined time, and
  generate detection result data indicating whether the predetermined event is generated at the predetermined time, and
the data management apparatus is configured to:
  receive the detection result data from the log management device;
  determine whether the log data is to be transmitted from the transmission terminal to the log management device based on the detection result data to generate a determination result;
  store, in a second memory, transmission approval data having the determination result generated based on the detection result data received from the log management device;
  transmit the transmission approval data having the determination result to the transmission terminal to cause the transmission terminal to transmit the log data according to the determination result of the transmission approval data;
  compare the determination result of the transmission approval data stored in the second memory with a new determination result of the transmission approval data that is generated based on new detection result data received to generate a comparison result, and only when the comparison result indicates that the determination result and the new determination result are different from each other, the data management apparatus transmits the transmission approval data having the new determination result to the transmission terminal to cause the transmission terminal to transmit the log data according to the new determination result of the transmission approval data;
  determine whether the log data is to be transmitted from the transmission terminal to the log management device based on log type data indicating a type of log data subjected for transmission in addition to the detection result data to generate the determination result indicating whether the log data is to be transmitted from the transmission terminal to the log management device for each type of log data, and to generate the transmission approval data for each type of log data having the determination result; and
  the log data generated by the transmission terminal is classified into first log type data that is generated in relation to interruption in data transmission, and second log type data other than the first log type data, and the data management apparatus is configured to generate first transmission approval data having a determination result indicating that the first log type data is to be transmitted from the transmission terminal to the log management device based on the detection result data, and second transmission approval data having a determination result indicating that the second log type data is not to be transmitted from the transmission terminal to the log management device based on the detection result data.

9. The transmission system of claim 8, wherein the transmission terminal includes:
a receiver to receive the transmission approval data from the data management apparatus;
a temporary log storage to temporarily store the log data when the transmission approval data has a determination result indicating that the log data is not to be transmitted to the log management device; and
a transmitter to transmit the temporarily stored log data to the log management device when the receiver receives transmission approval data having a determination result indicating that the log data is to be transmitted to the log management device.

10. The transmission system of claim 9, wherein the log management device includes a plurality of log management devices, and the transmission terminal further includes:
processing circuitry configured to
  store priority data indicating a degree of priority in selecting each one of the plurality of log management devices in association with device identification information for identifying each one of the plurality of log management devices; and
  select one of the plurality of log management devices as a destination to which the log data is to be transmitted based on the transmission approval data and the priority data.

11. The transmission system of claim 10, wherein:
the log data generated by the transmission terminal relates to a process being performed during a session to transmit call data between the transmission terminal and a counterpart transmission terminal, and
the transmission terminal transmits the log data to the log management device through a session that is different from the session to transmit the call data.

12. The transmission system of claim 11, wherein:
the transmission terminal is further configured to send at least contents of the log data to the counterpart transmission terminal through the session to transmit the call data, when the transmission approval data received from the data management apparatus has a determination result indicating that the log data is not to be transmitted to the log management device.

13. The transmission system of claim 8, wherein:
the data management apparatus is further configured to determine whether the detection result data is not received from the log management device for a predetermined time period, and generates a determination result indicating that the log data is not to be transmitted from the transmission terminal to the log management device.

14. A method, implemented by a data management apparatus, of managing transmission of log data generated by a transmission terminal from the transmission terminal to a log management device, the method comprising:
receiving detection result data indicating whether a predetermined event is detected at the log management device;

determining whether the log data is to be transmitted from the transmission terminal to the log management device based on the detection result data to generate a determination result;

storing, in a memory, transmission approval data having the determination result generated based on the detection result data received in the receiving step;

transmitting the transmission approval data having the determination result to the transmission terminal to cause the transmission terminal to transmit the log data according to the determination result of the transmission approval data, comparing the determination result of the transmission approval data stored in the memory with a new determination result of the transmission approval data that is generated based on new detection result data received by the receiver to generate a comparison result, and only when the comparison result indicates that the determination result and the new determination result are different from each other, the transmitting the transmission approval data having the new determination result to the transmission terminal to cause the transmission terminal to transmit the log data according to the new determination result of the transmission approval data;

determining whether the log data is to be transmitted from the transmission terminal to the log management device based on log type data indicating a type of log data subjected for transmission in addition to the detection result data to generate the determination result indicating whether the log data is to be transmitted from the transmission terminal to the log management device for each type of log data, and to generate the transmission approval data for each type of log data having the determination result, wherein the log data generated by the transmission terminal is classified into first log type data that is generated in relation to interruption in data transmission, and second log type data other than the first log type data, and the method includes generating first transmission approval data having a determination result indicating that the first log type data is to be transmitted from the transmission terminal to the log management device based on the detection result data, and second transmission approval data having a determination result indicating that the second log type data is not to be transmitted from the transmission terminal to the log management device based on the detection result data.

* * * * *